(12) United States Patent
Matsuda

(10) Patent No.: US 6,920,509 B1
(45) Date of Patent: Jul. 19, 2005

(54) DEVICE INFORMATION ACQUISITION METHOD, DEVICE CONTROLLER, AND BRIDGE

(75) Inventor: Jun-ichi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 09/671,579

(22) Filed: Sep. 27, 2000

(30) Foreign Application Priority Data

Sep. 28, 1999 (JP) .......................................... 11-275368

(51) Int. Cl.⁷ ............................................... G06F 3/00
(52) U.S. Cl. ............................. 710/8; 710/15; 710/300; 710/306
(58) Field of Search .............................. 710/8, 15, 300, 710/306

(56) References Cited

U.S. PATENT DOCUMENTS

| | | | | |
|---|---|---|---|---|
| 5,892,974 | A | 4/1999 | Koizumi et al. ............ | 395/836 |
| 6,286,067 | B1 * | 9/2001 | James et al. ................ | 710/104 |
| 6,374,316 | B1 * | 4/2002 | James et al. ................ | 710/104 |
| 6,408,355 | B1 * | 6/2002 | Toguchi ...................... | 710/314 |
| 6,445,711 | B1 * | 9/2002 | Scheel et al. ............... | 370/402 |
| 6,466,549 | B1 * | 10/2002 | Hattig ........................ | 370/254 |
| 6,512,767 | B1 | 1/2003 | Takeda et al. | |
| 6,519,671 | B1 * | 2/2003 | Kondou et al. ............. | 710/311 |
| 6,667,992 | B1 * | 12/2003 | Yanagawa ................... | 370/490 |

FOREIGN PATENT DOCUMENTS

| | | |
|---|---|---|
| EP | 0 930 747 | 7/1999 |
| JP | 9-512369 | 12/1997 |
| JP | 11-055297 | 2/1999 |
| JP | 11-068884 | 3/1999 |
| JP | 11-205363 | 7/1999 |
| JP | 11-220485 | 8/1999 |
| JP | 11-252093 | 9/1999 |

OTHER PUBLICATIONS

Dr. David V. James, "High performance Serial bus bridges," Submission to the P1394.1 Committee, Online! Aug. 23, 1999, pp. 1–138, XP002212561, Retrieved from the Internet: URL:http://grouper.ieee.org/groups/1394/1/Documents/br047r07.pdf retrieved on Sep. 6, 2002.

* cited by examiner

*Primary Examiner*—Jeffrey Gaffin
*Assistant Examiner*—Eron Sorrell
(74) *Attorney, Agent, or Firm*—Foley & Lardner LLP

(57) ABSTRACT

In a device information acquisition method, it is discriminated whether a network is constituted by a plurality of buses or a single bus. A bus ID assigned to each of remote buses is acquired. Device information is acquired from each of devices connected to the network. When at least one of the remote buses is disconnected from the network, the device information of the device connected to the disconnected remote bus is discarded. If it is discriminated that the network is constituted by a single bus, the information of all devices connected to the local bus is acquired. If it is discriminated that the network is constituted by a plurality of buses, the information of all devices connected to each of the buses having the acquired bus ID is acquired. A device controller and bridges using the device information acquisition method are also disclosed.

37 Claims, 17 Drawing Sheets

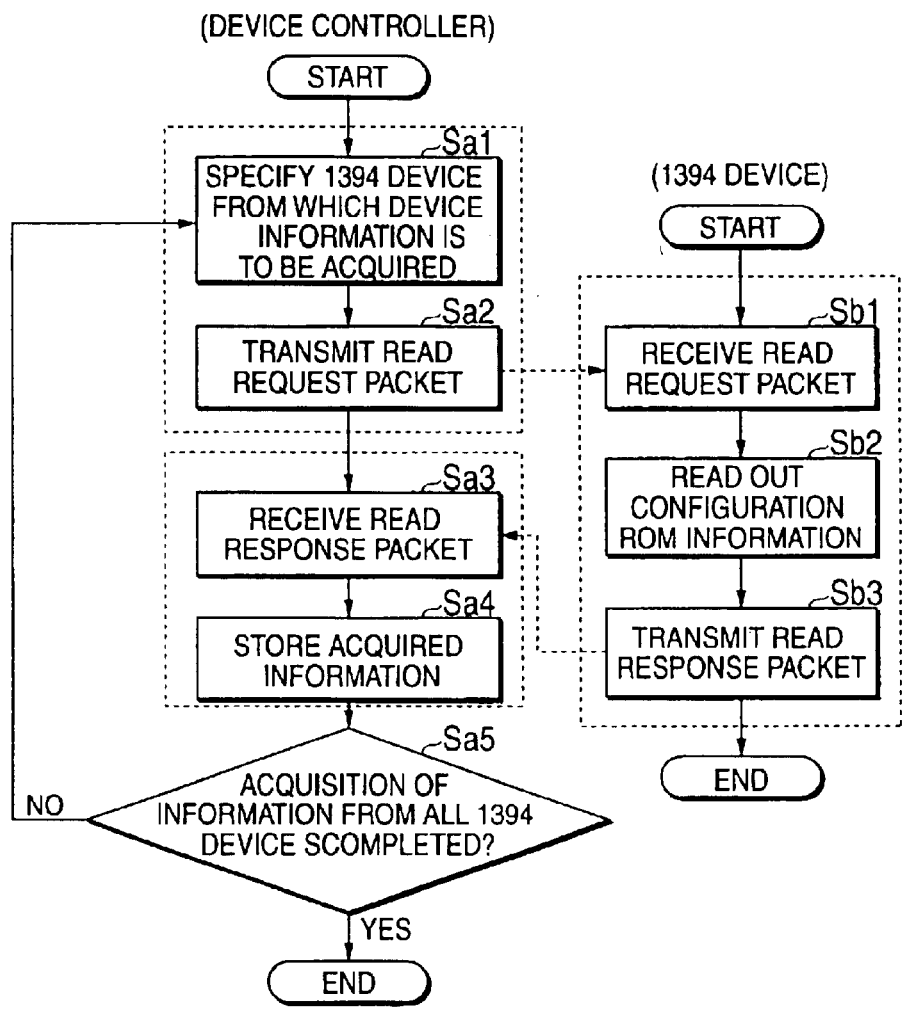

FIG. 10

| BUS ID (10BIT) | PHY ID (6BIT) | DEVICE INFORMATION | PORTAL |
|---|---|---|---|
| 3FFh | 00h | DEVICE INFORMATION OF 1394 DEVICE 21 | 0 |
| 3FFh | 01h | DEVICE INFORMATION OF PORTAL 6 | 1 |
| 3FFh | 02h | DEVICE INFORMATION OF PORTAL 3 | 1 |
| 3FFh | 03h | DEVICE INFORMATION OF NODE 13 | 0 |
| 3FFh | 04h | DEVICE INFORMATION OF 1394 DEVICE 22 | 0 |
| 3FFh | 05h | DEVICE INFORMATION OF PORTAL 5 | 1 |

FIG. 16

| BUS ID (10BIT) | PHY ID (6BIT) | DEVICE INFORMATION | PORTAL |
|---|---|---|---|
| 001h | 00h | DEVICE INFORMATION OF 1394 DEVICE 21 | 0 |
| 001h | 01h | DEVICE INFORMATION OF PORTAL 6 | 1 |
| 001h | 02h | DEVICE INFORMATION OF PORTAL 3 | 1 |
| 001h | 03h | DEVICE INFORMATION OF NODE 13 | 0 |
| 001h | 04h | DEVICE INFORMATION OF 1394 DEVICE 22 | 0 |
| 001h | 05h | DEVICE INFORMATION OF PORTAL 5 | 1 |
| 000h | 00h | DEVICE INFORMATION OF PORTAL 4 | 1 |
| 000h | 01h | DEVICE INFORMATION OF 1394 DEVICE 14 | 0 |
| 000h | 02h | DEVICE INFORMATION OF 1394 DEVICE 15 | 0 |
| 000h | 03h | DEVICE INFORMATION OF 1394 DEVICE 16 | 0 |
| 002h | 00h | DEVICE INFORMATION OF PORTAL 11 | 1 |
| . . . | . . . | . . . | . . . |
| 003h | 02h | DEVICE INFORMATION OF 1394 DEVICE 24 | 0 |

DEVICE INFORMATION ACQUISITION METHOD, DEVICE CONTROLLER, AND BRIDGE

BACKGROUND OF THE INVENTION

1. Field of the Invention

The present invention relates to a device information acquisition method, device controller, and bridge in an IEEE 1394-based communication network.

2. Description of the Prior Art

The IEEE 1394 standard is a high-speed serial bus standard, which defines methods for main signal transfer and control signal transfer between personal computers, peripheral devices such as printers, hard disks, and image scanners, video devices such as digital video cameras, and audio devices. A network can be constructed by connecting a plurality of devices incorporating IEEE 1394 bus interfaces (to be referred to as 1394 devices hereinafter).

In a bus based on the IEEE 1394 standard (to be simply referred to as a bus hereinafter), when, for example, a 1394 device is connected/disconnected, bus initialization (to be referred to as bus reset hereinafter) is performed, and an ID number (to be referred to as PHY ID hereinafter) is automatically assigned to the 1394 device. The assigned PHY ID is stored in the CSR space and held by each 1394 device. PHY ID assignment is performed every time bus reset occurs, and the value assigned to each 1394 device can dynamically change. Communication between 1394 devices is disabled until PHY ID assignment is completed upon occurrence of bus reset. As a method of performing communication between 1394 devices, a method using asynchronous packets is available.

FIG. 1 is a view conceptually showing a specific example of an asynchronous packet. Referring to FIG. 1, a bus ID which is an ID number defined by the IEEE 1394 standard and assigned to the bus to which a destination 1394 device is connected is written in a destination_bus_ID field 54. For communication to be performed within one bus, this bus ID may be written as "3FFh". Note that the last letter "h" indicates that the value is hexadecimal. In a destination_physical_ID field 55, the PHY ID assigned to the source 1394 device is written. In a tcode field 56, the value that represents the type of asynchronous packet and is defined by the IEEE 1394 standard is written. In a source_ID field 57, the bus ID of the bus to which the 1394 device is connected is written in the upper 10 bits, and the PHY ID of the source 1394 device is written in the lower 6 bits. In a data field 58, information to be transmitted is written.

Communications using asynchronous packets are classified into a read transaction aiming at reading out the contents of the CSR space of the destination 1394 device, a write transaction aiming at a write, and a lock transaction. Asynchronous packets used in a read transaction are called a read request packet and read response packet. Asynchronous packets used in a write transaction are called a write request packet and write response packet. Asynchronous packets used in a lock transaction are called a lock request packet and lock response packet.

In order to control a 1394 device connected to a bus, it is required to acquire device information indicating what performance the 1394 device has and what control is possible. A method of acquiring such device information is conventionally used by a device controller aiming at controlling a 1394 device when the controller acquires the device information of the 1394 device as a control target, as disclosed in, for example, Japanese Unexamined Patent Publication No. 11-205363.

FIG. 2 is a block diagram showing an example of the arrangement of a conventional device controller. Referring to FIG. 2, a device controller 59 is comprised of a device control section 60, device information management table storage section 61, serial bus management 62, 1394 transaction layer 63, 1394 link layer 64, and 1394 physical layer 65. The device controller 59 acquires device information from a 1394 device connected to the bus before device control operation, and stores the acquired information in the device information management table storage section 61 upon linking it with the PHY ID assigned to each 1394 device. An example of the device information which the destination_physical_ID field 55 acquires from the 1394 device is Configuration ROM, which is defined in IEEE 1394 standard, stored at addresses FFFF FFFF F0000 0400h to FFFF FFFF F0000 07FFh in the CSR space and set in each 1394 device. From this information, the device controller 59 can recognize the performance of the 1394 device, to which a given PHY ID is assigned, control which the device can accept, and the like.

FIG. 3 is a flow chart for explaining operation in a conventional device information acquisition method. The device controller 59 specifies a 1394 device from which no device information has been acquired (step Sa1), and transmits a read request packet to the 1394 device (step Sa2). Upon reception of the read request packet (step Sb1), the 1394 device reads out its own Configuration ROM information (step Sb2), and transmits a read response packet containing the readout contents to the device controller 59 (step Sb3). Upon reception of the read response packet (step Sa3), the device controller 59 acquires the device information of the 1394 device from the received read response packet, and stores it in a management table (device information management table storage section 61) (step Sa4). The device controller 59 then checks whether device information is acquired from all 1394 devices (step Sa5). If information acquisition is not complete, the flow returns to step Sa1 to repeat the above processing. If acquisition of device information from all the 1394 devices connected to the bus is complete, the processing is terminated.

FIG. 4 is a view conceptually showing a specific example of the format of a management table for managing acquired device information. Referring to FIG. 4, in a PHY ID field 66, the value of the PHY ID assigned to a 1394 device is stored. In a device information field 67, the device information acquired from the 1394 device is stored. In controlling the device, the device control section 60 acquires the PHY ID assigned to the 1394 device as a control target from the device information stored in the device information management table storage section 61, and sends out a control signal to the bus through the 1394 transaction layer 63, 1394 link layer 64, and 1394 physical layer 65.

The PHY ID linked to device information may change every time bus reset occurs. Upon detection of bus reset, therefore, the device controller 59 re-acquires device information in accordance with the flow chart described above after a PHY ID is assigned to each 1394 device again, and updates the information stored in the management table (device information management table storage section 61).

An IEEE 1394 bridge for connecting a plurality of buses to each other and performing packet forwarding between different buses is under standardization. Using this IEEE 1394 bridge leads to a larger network based on the IEEE 1394 standard and higher efficiency. IEEE 1394 bridges are being standardized by the IEEE P1394.1 working group. An IEEE 1394 bridge has a plurality of portals and an internal switching fabric for exchanging packets between the portals. The respective portals are connected to different buses.

FIG. 5 is a block diagram showing an example of the arrangement of the IEEE 1394 bridge. Referring to FIG. 5, an IEEE 1394 bridge 68 is comprised of portals 69 to 71 and an internal switching fabric 72. The portals 69 to 71 are respectively connected to buses 73 to 75. The portals 69 to 71 behave as 1394 devices on the buses. When each portal receives a packet to be sent to another bus, the portal temporarily outputs the received packet to the internal switching fabric 72. The internal switching fabric 72 outputs the packets sent from the portals 69 to 71 to the corresponding portals 69 to 71. Upon reception of the packets from the internal switching mechanism 72, the portals 69 to 71 send out the packets to the buses to which they are connected.

As described above, in a network constituted by different buses connected to each other through an IEEE 1394 bridge, even when bus reset occurs in a given bus, initialization and reassignment of a PHY ID are performed in only the bus in which the bus reset has occurred. For this reason, the remaining buses connected through the IEEE 1394 bridge do not recognize the occurrence of the bus reset. Consequently, communication is not interrupted by bus reset that has occurred in another bus. Consider a general network constituted by a plurality of buses using an IEEE 1394 bridge. The IEEE 1394 bridge has the function of selecting a packet, from the asynchronous packets received by a given portal, which is to be sent to another bus, and transferring the packet. An asynchronous packet forwarding method will be described in detail below with reference to the P1394.1 draft standard issued by the P1394.1 working group.

The IEEE 1394 bridge extracts a destination_bus_ID field from a received asynchronous packet and determines by referring to prestored forwarding information whether to forward the received packet to an adjacent bus. As the storage form of forwarding information, a routing map constituted by 1,023-bit strings as shown in, for example, FIG. 6 is available. When a routing map is to be set such that an asynchronous packet whose destination_bus_ID field has a value "n" is forwarded, the value of the upper (n+1)th bit is set to "1". In the routing map shown in FIG. 6, "1"s are set in the upper 1st, 2nd, and 4th bits.

The conventional device information acquisition method can only acquire the information of a 1394 device connected to the bus to which the self-apparatus is connected and update the acquired device information because no consideration is given to a network constituted by a plurality of buses using an IEEE 1394 bridge. According to the prior art, therefore, in a network constructed by connecting a plurality of buses to each other, the device information of all the connected 1394 devices cannot be entirely acquired. As a consequence, the acquired device information of all the devices cannot be entirely updated in accordance with bus reset and changes in topology.

SUMMARY OF THE INVENTION

The present invention has been made in consideration of the above situation in the prior art, and has as its object to provide a device information acquisition method which can acquire device information of all devices connected to a network formed by connecting a plurality of buses to each other using a bridge and update the acquired device information of all the devices in accordance with bus reset that occurs in a bus connected to the network or a change in topology, a device controller, and a bridge.

In order to achieve the above object, according to the first aspect of the present invention, there is provided a device information acquisition method of acquiring device information in which a function of devices are written from the devices connected to a network constituted by a single bus which is a local bus to which the devices are connected or a network formed by connecting, through bridges, a plurality of buses including the local bus and remote buses to which the devices are not connected, comprising the discrimination step of discriminating whether the network is constituted by a plurality of buses or a single bus, the bus ID acquisition step of acquiring a bus ID assigned to each of the remote buses, the information acquisition step of acquiring device information from all devices connected to the network, and the information discarding step of, when at least one of the remote buses is disconnected from the network, discarding device information of devices connected to the disconnected remote bus, wherein if it is discriminated in the discrimination step that the network is constituted by a single bus, the information acquisition step is executed with respect to all devices connected to the local bus, and if it is discriminated in the discrimination step that the network is constituted by a plurality of buses, the information acquisition step is executed with respect to all devices connected to the buses each having the bus ID acquired in the bus ID acquisition step.

According to the second aspect of the present invention, in the device information acquisition method of the first aspect, the discrimination step comprises checking whether the bridges are connected to the local bus, thereby discriminating whether the network is constituted by a plurality of buses.

According to the third aspect of the present invention, in the device information acquisition method of the first aspect, the discrimination step comprises discriminating, if the value of the bus ID acquired in the bus ID acquisition step is a predetermined value, whether the network is constituted by a single bus, and discriminating, if the value of the bus ID is other than the predetermined value, that the network is constituted by a plurality of buses.

According to the fourth aspect of the present invention, in the device information acquisition method of the first aspect, each of the bridges receives an asynchronous packet on the local bus and holds forwarding information for determining whether to forward the asynchronous packet to the remote buses, and the bus ID acquisition step comprises acquiring forward information from all bridges connected to the local bus.

According to the fifth aspect of the present invention, in the device information acquisition method of the first aspect, at least one bus ID management node for managing bus ID usage information in which all bus IDs assigned to at least one bus constituting the network is connected to the network, and the bus ID acquisition step comprises acquiring bus IDs assigned to all the buses by acquiring the bus ID usage information from the bus ID management node.

According to the sixth aspect of the present invention, in the device information acquisition method of the first aspect, the information acquisition step comprises the identifier acquisition step of acquiring an identifier assigned to each of the devices connected to the buses of the network, and the individual device information acquisition step of acquiring the device information from each device identified by the identifier acquired in the identifier acquisition step.

According to the seventh aspect of the present invention, in the device information acquisition method of the sixth aspect, at least one identifier management node for managing the identifiers, acquired by performing the identifier acquisition step with respect to the respective devices connected to each bus, by writing the identifiers in identifier usage information is connected to each of the buses of the network, and the individual device information acquisition step is performed with respect to each of the devices identified by the identifier written in the identifier usage information acquired from the identifier management node.

According to the eighth aspect of the present invention, in the device information acquisition method of the sixth aspect, at least one device information holding node for holding the device information acquired in the individual device information acquisition step is connected to each of the buses of the network by performing the identifier acquisition step and the individual device information step with respect to each of the device connected to each bus, and the device information is acquired from the device information holding node.

According to the ninth aspect of the present invention, in the device information acquisition method of the first aspect, the method further comprises the initialization notification request step of requesting the node connected to each of the remote buses to notify occurrence of bus initialization in the remote bus, and the information acquisition step is performed again with respect to each of the devices connected to the remote buses upon reception of a notification to the initialization notification request step.

According to the tenth aspect of the present invention, in the device information acquisition method of the first aspect, at least counting node having a counter indicating the number of times of occurrence of bus initialization in the single bus or the plural buses of the network is connected to each bus, the method further comprises the acquisition step of periodically acquiring a value of the counter of the counting node connected to each of the remote buses, and the information acquisition step is performed again with respect to each of the devices connected to the remote bus when a value different from the previously acquired value is acquired in the acquisition step.

According to the eleventh aspect of the present invention, in the device information acquisition method of the fourth aspect, the method further comprises the update notification request step of requesting the bridge connected to the local bus to notify that the forwarding information held by the bridge is updated, and the forwarding information check step of checking whether a bit updated from a first state value to a second state value and a bit updated from the second state value to the first state value exist in the forwarding information when a notification to the update notification request step is received, when the bit updated from the first state value to the second state value is detected in the forwarding information check step, the information acquisition step is performed with respect to each device connected to a bus having a bus ID represented by the bit, and when the bit updated from the second state value to the first state value is detected, the information discarding step is performed with respect to each device connected to a bus having a bus ID represented by the bit.

According to the twelfth aspect of the present invention, in the device information acquisition method of the fourth aspect, the method further comprises the forwarding information acquisition step of periodically acquiring the forwarding information held by the bridge connected to the local bus, and the forwarding information check step of checking whether a bit updated from a first state value to a second state value and a bit updated from the second state value to the first state value exist in the forwarding information acquired in the forwarding information acquisition step, and when the bit updated from the first state value to the second state value is detected in the forwarding information check step, the information acquisition step is performed with respect to each device connected to a bus having bus ID represented by the bit, and when the bit updated from the second state value to the first state value is detected, the information discarding step is performed with respect to each device connected to a bus having a bus ID represented by the bit.

According to the thirteenth aspect of the present invention, in the device information acquisition method of the fifth aspect, the method further comprises the bus ID change check step of periodically acquiring the bus ID usage information and checking on the basis of the acquired bus ID usage information whether a newly used bus ID or a bus ID that has not been used exists, and when existence of the newly used bus ID is detected in the bus ID change check step, the information acquisition step is performed with respect to each device connected to a bus identified by the bus ID, and when existence of a bus ID that has not been used is detected, the information discarding step is performed with respect to each device connected to a bus identified by the bus ID.

According to the fourteenth aspect of the present invention, in the device information acquisition method of the first aspect, the method further comprises updating the acquired device information by periodically performing the discrimination step, the bus ID acquisition step, and the information acquisition step.

According to the fifteenth aspect of the present invention, there is provided a device controller which is a node connected to a network formed by connecting a plurality of buses to each other through a bridge, comprising acquisition execution means for executing the device information acquisition method defined in any one of the first to 14th aspects.

According to the sixteenth aspect of the present invention, there is provided a bridge for forming a network by connecting a plurality of buses to which devices are connected, comprising transmission means for, upon reception of a read request for information held by the bridge, transmitting the information to a request source in executing the device information acquisition method defined in any one of first to 14th aspects described above.

As is obvious from each aspect described above, according to the present invention, it is discriminated whether a network is constituted by a plurality of buses or a single bus, and device information is acquired from all devices connected to the local bus if it is discriminated that the network is constituted by a single bus. If it is determined in the discrimination step that the network is constituted by a plurality of buses, the bus IDs assigned to the respective remote buses are acquired, and device information is acquired from all the devices connected to the respective buses having the bus IDs. In the network formed by connecting a plurality of buses using a bridge, the device information of all the connected devices can be acquired. In addition, at least one remote bus is disconnected from the network, the device information of the devices connected to the disconnected remote bus is discarded. Therefore, the acquired device information can be updated in accordance with bus reset that occurs in a bus connected to the network or a change in topology.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 3 is a flow chart showing the flow of processing in a conventional device information acquisition method;

FIG. 4 is a conceptual view showing a specific example of a conventional management table for managing device information;

FIG. 10 is a conceptual view showing a specific example of a management table for stored device information;

FIG. 16 is a conceptual view showing a specific example of a management table at the end of acquisition of device information;

DETAILED DESCRIPTION OF THE PREFERRED EMBODIMENTS

Several preferred embodiments of the present invention will be described below with reference to the accompanying drawings.

I. First Embodiment

I-1. Device Information Acquisition Method

Figure 7:
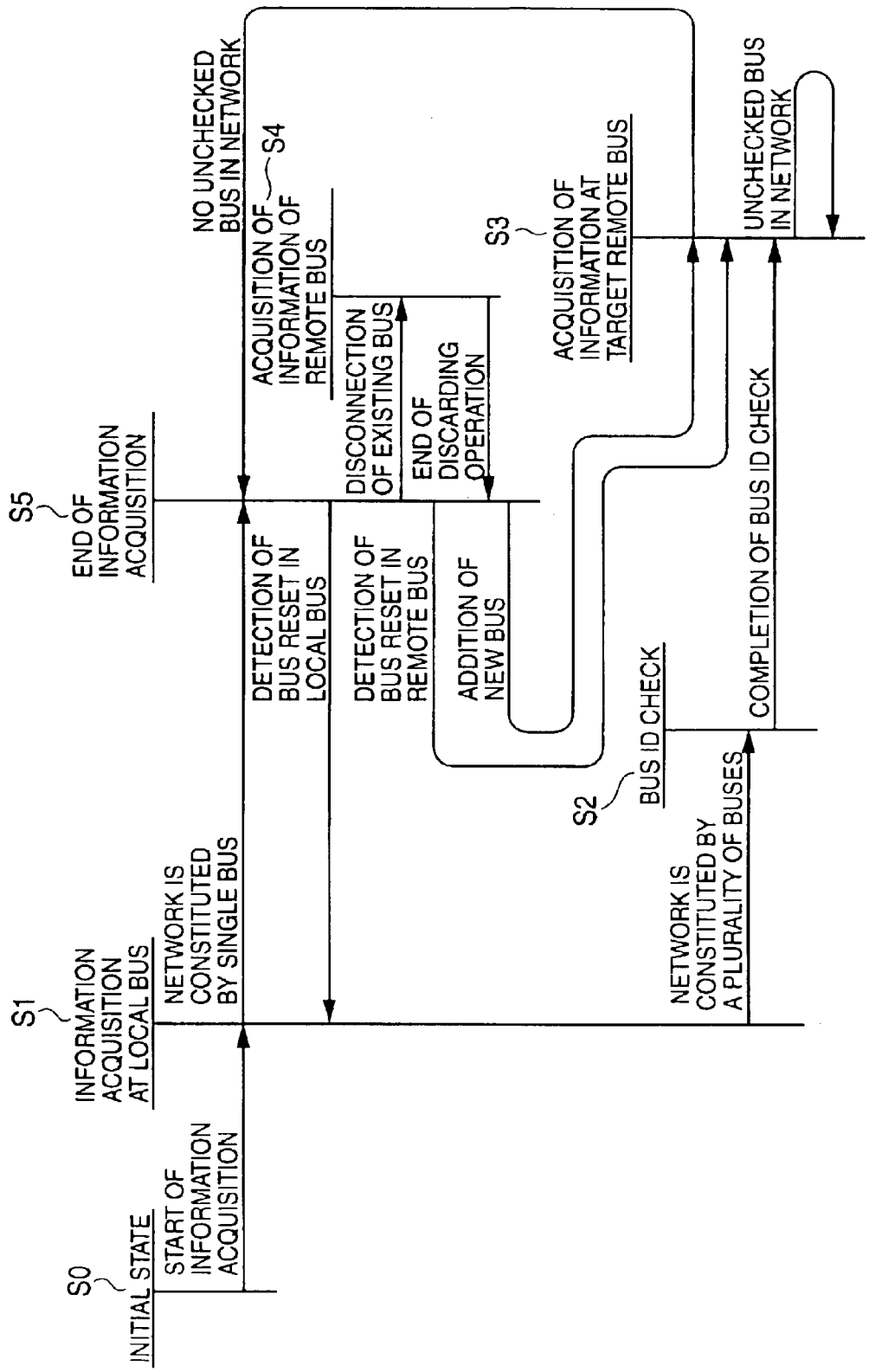
FIG. 7 is a conceptual view showing an outline of a device information acquisition method according to the first embodiment of the present invention.

FIG. 7 is a conceptual illustration for briefly explaining a device information acquisition method according to the first embodiment of the present invention. In this case, the bus to which a 1394 device from which device information is to be acquired will be referred to as a local bus, and buses, other than the local bus, which constitute a network will be referred to as remote buses.

Processes in the device information acquisition method can be classified into the following six states:

(1) Initial State S0:
In this state, no processing for device information acquisition is performed.
(2) State S1 in which Information Acquisition is being Performed through Local Bus:
Device information is being acquired from each 1394 device connected to the local bus.
(3) State S2 in which Bus IDs are being Checked:
All the bus IDs assigned to the buses connected to the network are checked to specify the bus ID of a remote bus from which no information is being acquired.
(4) State S3 in which Information is being Acquired from 1394 Device Connected to Target Remote Bus:
Information is being acquired from each 1394 device connected to a remote bus.
(5) State S4 in which Information of 1394 Device Connected to Remote Bus is being Discarded:
All the information of each 1394 device connected to a remote bus disconnected from the network is being discarded.
(6) State S5 in which Information Acquisition for all 1394 Devices is Completed:
Information acquisition for all the devices connected to the network is completed.

The following are the conditions for state transitions. Note that ":" represents a state transition. For example, "S0:S1" indicates "a transition from the state S0 to the state S1".

S0:S1 indicates that device information acquisition starts.

S1:S2 indicates that information acquisition from all the 1394 devices connected to the local bus is completed, and the network is constituted by a plurality of buses using an IEEE 1394 bridge.

S1:S5 indicates that information acquisition from all the 1394 devices connected to the local bus is completed, and the network is constituted by a single bus.

S2:S3 indicates that the bus IDs assigned to the buses connected to the network are completely checked.

S3: S3 indicates that the network includes an unchecked remote bus.

S3:S5 indicates that the network includes no unchecked remote bus.

S4:S5 indicates that the information of a device connected to a remote bus is completely discarded. S5:S1 indicates that bus reset in the local bus is detected.

S5:S3 indicates that (1) bus reset in a remote bus is detected, or (2) a new bus is connected to the network.

S5:S4 indicates that an existing bus is disconnected from the network.

I-2. Arrangement of Network

Figure 8:
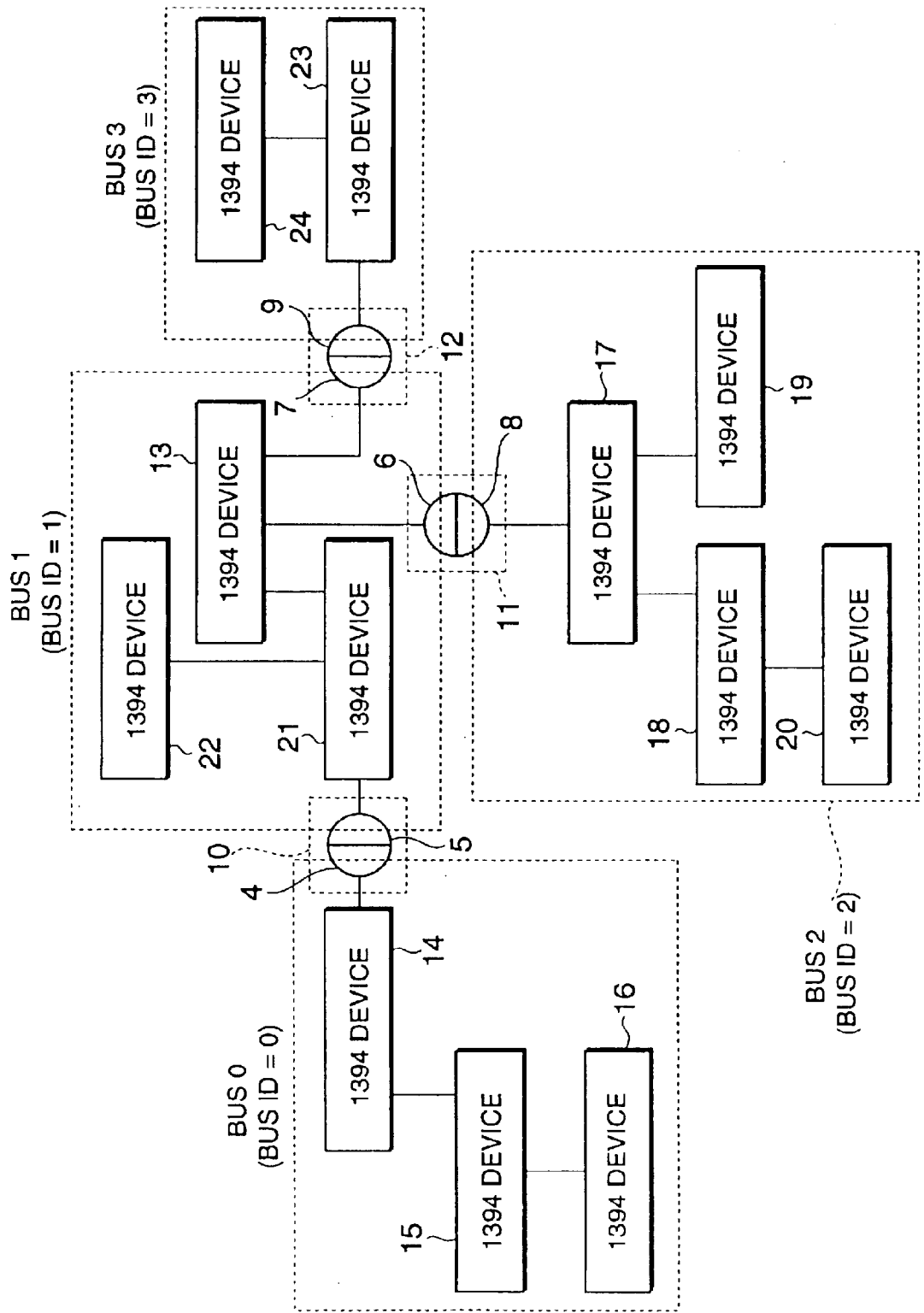
FIG. 8 is a block diagram showing a specific example of a network formed by connecting a plurality of buses to each other using an IEEE 1394 bridge.

Processing in each state in the device information acquisition method according to the first embodiment of the present invention will be described in detail next with reference to the accompanying drawings. FIG. 8 is a block diagram showing an example of the arrangement of the network. Referring to FIG. 8, the network is formed by connecting four buses 0 to 4 to each other through IEEE 1394 bridges 10 to 12 each constituted by two portals. Assume that in the first embodiment, each of portals 4 to 9 constituting the IEEE 1394 bridges 10 to 12 has a register (to be referred to as a portal register hereinafter), in the CSR space, which stores information identifying itself as a portal to discriminate the self-device from other 1394 devices. Another 1394 device can recognize the portal by reading out information from the portal register by using a read transaction.

Bus IDs are assigned to the respective buses. In the first embodiment, a portal (to be referred to as an NCM hereinafter) having the function of assigning the bus IDs and managing the usage state of the bus IDs in use assigns bus IDs to the respective buses. Only one NCM exists in the overall network. In the first embodiment, the portal 4 is the NCM. Note that the bus ID assigned to a given bus does not change as long as the bus is connected to the network in which the NCM exists. If the NCM is disconnected from the network, since the portal for assigning and managing bus IDs stops existing on the network, the bus IDs assigned to all the buses are discarded. Subsequently, communication cannot be performed between different buses until a new NCM is defined and new bus IDs are assigned. As the storage form of the usage information of the bus IDs used in the network, which is stored in the NCM, a bus ID bitmap constituted by 1,023-bit strings is used. In the bus ID bitmap, if, for example, a bus ID "n" is used, the upper (n+1)th bit in the bitmap is set to "1".

In the first embodiment, the bus ID assigned to each bus must be notified to the portal of each bus, but is not notified to 1394 devices other than the portals. If the 1394 devices other than the portals are not notified of the above information, the upper 10 bits of a source_ID field 57 of an asynchronous packet transmitted from each 1394 device is set to "3FFh" because the 1394 device does not recognize the bus ID of the bus to which it is connected. Upon reception of an asynchronous packet to be forwarded to another bus, a portal extracts the upper 10 bits of the source_ID field 57. If the extracted value is "3FFh", the portal rewrites it into the bus ID of the bus to which it is connected.

According to the first embodiment, in communication using asynchronous packets between different buses, a virtual ID number (to be referred to as a virtual ID hereinafter) that does not change in response to bus reset is used. The virtual ID will be described below.

The virtual ID has a length of 6 bits and is set in a destination_physical_ID field 55 in place of the PHY ID assigned to a destination node when an asynchronous packet is to be transmitted to the destination node connected to another bus. The virtual ID is assigned to each 1394 device by one portal (to be referred to as an alpha portal hereinafter) selected from the portals connected to the bus. In the case shown in FIG. 8, the alpha portal of the bus 0 is the portal 4; the alpha portal of the bus 1, the portal 5; the alpha portal of the bus 2, the portal 8; and the alpha portal of the bus 3, the portal 9.

The virtual ID assigned to each node is managed by only a corresponding portal and is not notified to other nodes. When, therefore, communication is to be performed with a 1394 device connected to another bus by using a virtual ID, the portal that is connected to the same bus as that of the transmission node for a packet and forwards the packet to another bus converts the PHY ID of the source 1394 device which is written in the lower 6 bits of the source_ID field into a virtual ID, and then outputs the packet to an internal switching fabric 72. When the asynchronous packet sent from the internal switching fabric 72 is to be sent out to the bus to which the source node is connected, the packet is sent out after the destination_physical_ID field 55 is converted into the PHY ID actually assigned to the destination 1394 device.

Figure 1:
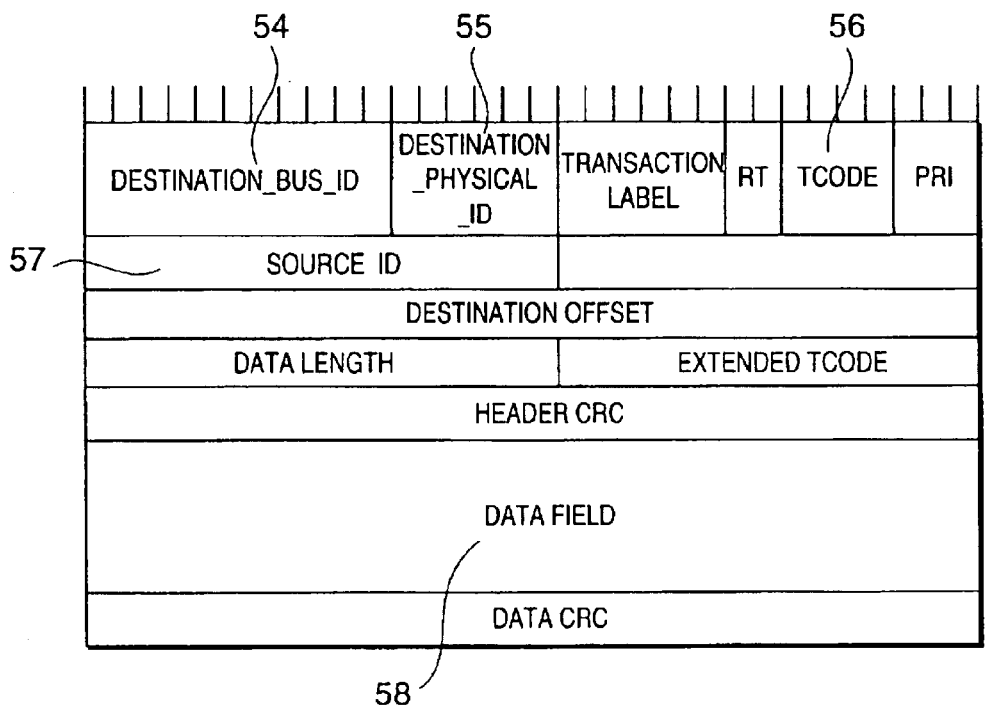
FIG. 1 is a conceptual view showing the format of an asynchronous packet defined by the IEEE 1394 standard.
Figure 2:
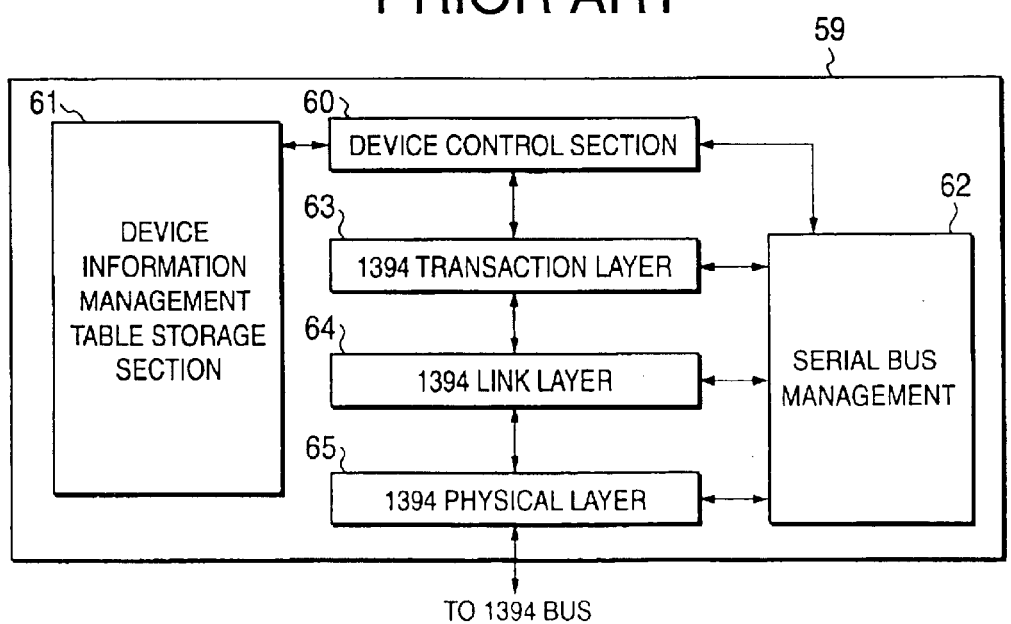
FIG. 2 is a block diagram showing the arrangement of a conventional device controller.
Figure 5:
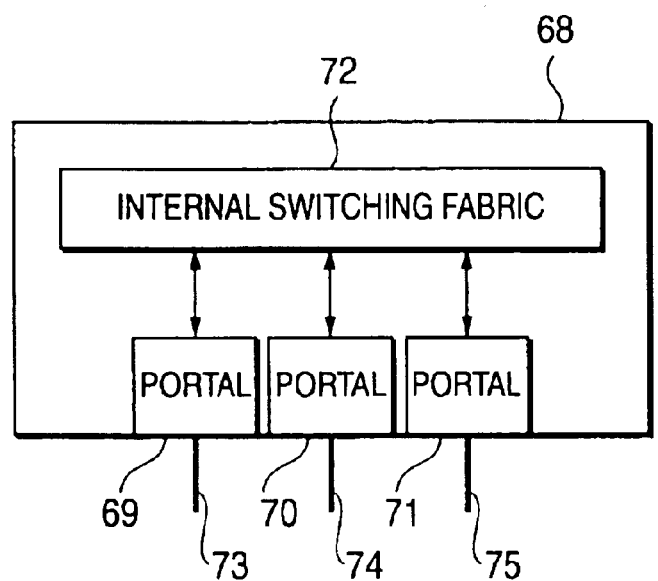
FIG. 5 is a block diagram showing an example of the arrangement of an IEEE 1394 bridge.
Figure 6:
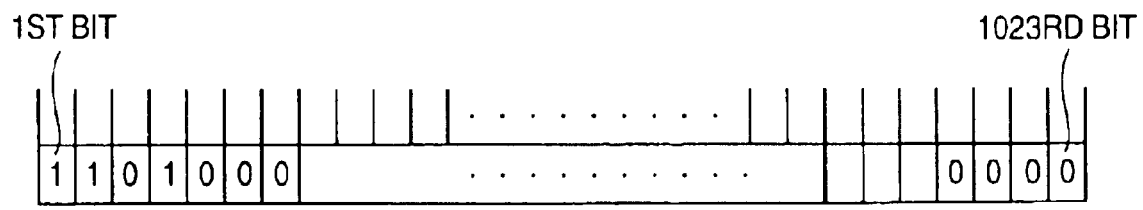
FIG. 6 is a conceptual view showing a specific example of a routine map.

In order to perform the above processing, each portal has a virtual ID-PHY ID conversion table for the 1394 devices connected to the bus to which the portal itself is connected. A case wherein a 1394 device 13 connected to the bus 1 is to acquire device information will be described below. The 1394 device 13 is identical to the conventional device controller in FIG. 2 and serves as a node designed to acquire the device information of each device connected to the network and control the 1394 devices by referring to the acquired device information. From the viewpoint of the 1394 device 13, the network is constituted by the bus 1 as a local bus and the buses 0, 2, and 3 as remote buses.

Figure 9:
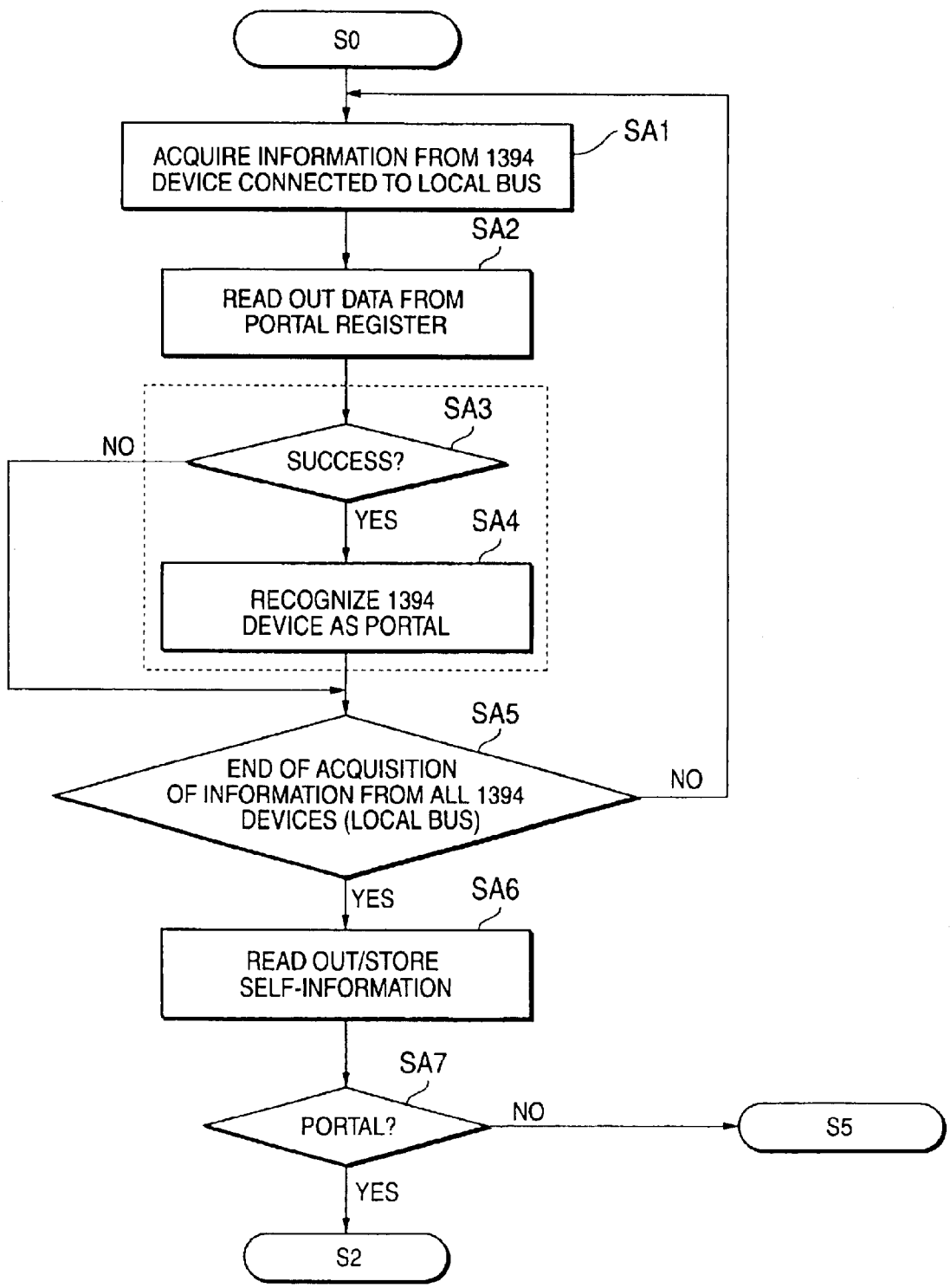
FIG. 9 is a flow chart showing the details of processing in a state S1.

I-3. Operation of First Embodiment
(1) Acquisition of Device Information in Local Bus:

FIG. 9 is a flow chart for explaining acquisition processing for the device information of each 1394 device connected to the bus 1 in the state S1 shown in FIG. 7. The 1394 device 13 acquires the device information of 1394 devices 21 and 22 connected to the bus 1 and the portals 5 to 7 by using a read transaction, and stores the acquired device information upon linking it to each PHY ID (step SA1). Thereafter, the 1394 device 13 acquires the information of the portal registers by performing a read transaction with respect to all the 1394 devices connected to the bus 1 (step SA2). The 1394 device 13 checks whether the read transaction has succeeded (step SA3). If the transaction has succeeded, the 1394 device 13 recognizes the 1394 devices as portals (step SA4). In the above read transaction, since success can attained for only the 1394 devices incorporating portal registers (portal registers 5 to 7), the 1394 device 13 recognizes the 1394 devices for which the read transaction with respect to the portal registers has succeeded as portals, and stores their information upon linking it to each PHY ID. The 1394 device 13 then checks whether acquisition of information from all the 1394 devices (local bus) is completed (step SA5), and repeatedly executes the above processing until the acquisition is completed. If the acquisition is completed, the 1394 device 13 stores its own device information upon linking it to the PHY ID assigned to the device itself (step SA6).

FIG. 10 is a view conceptually showing an example of the management table of the device information acquired in the local bus. Referring to FIG. 10, a bus ID field 25 has a 10-bit field and indicates the bus ID of the bus to which each 1394 device is connected. In the current stage, since the 1394 device 13 does not recognize the bus ID of the bus 1, the initial value "3FFh" is written. A PHY ID field 26 has a 6-bit field, in which the PHY ID assigned to each 1394 device is written. In a device information field 27, acquired device information is stored. In a PORTAL field 28, "1" is written if the 1394 device is a portal; "0" is written otherwise.

When the device information of all the 1394 devices connected to the bus 1 and the information in the portal registers are completely read out, the 1394 device 13 selectively performs subsequent processing depending on whether any portal is connected to the bus 1. More specifically, after the acquisition of the device information of all the 1394 devices connected to the bus 1, the 1394 device 13 looks up the management table for the stored device information to check whether there is any 1394 device in which "1" is written in the PORTAL field 28 (step SA7). If there is a 1394 device in which "1" is written in the PORTAL field 28, the 1394 device 13 makes a transition to the state S2 to acquire the device information of each 1394 device connected to a remote bus. If there is no 1394 device in which "1" is written in the PORTAL field 28, the 1394 device 13 terminates the device information acquisition and makes a transition to the state S5.

(2) Method of Checking Bus Ids:

Upon recognizing that the network is constituted by a plurality of buses, the 1394 device 13 makes a transition to the state S2 to check the bus IDs used in the network.

Figure 11:
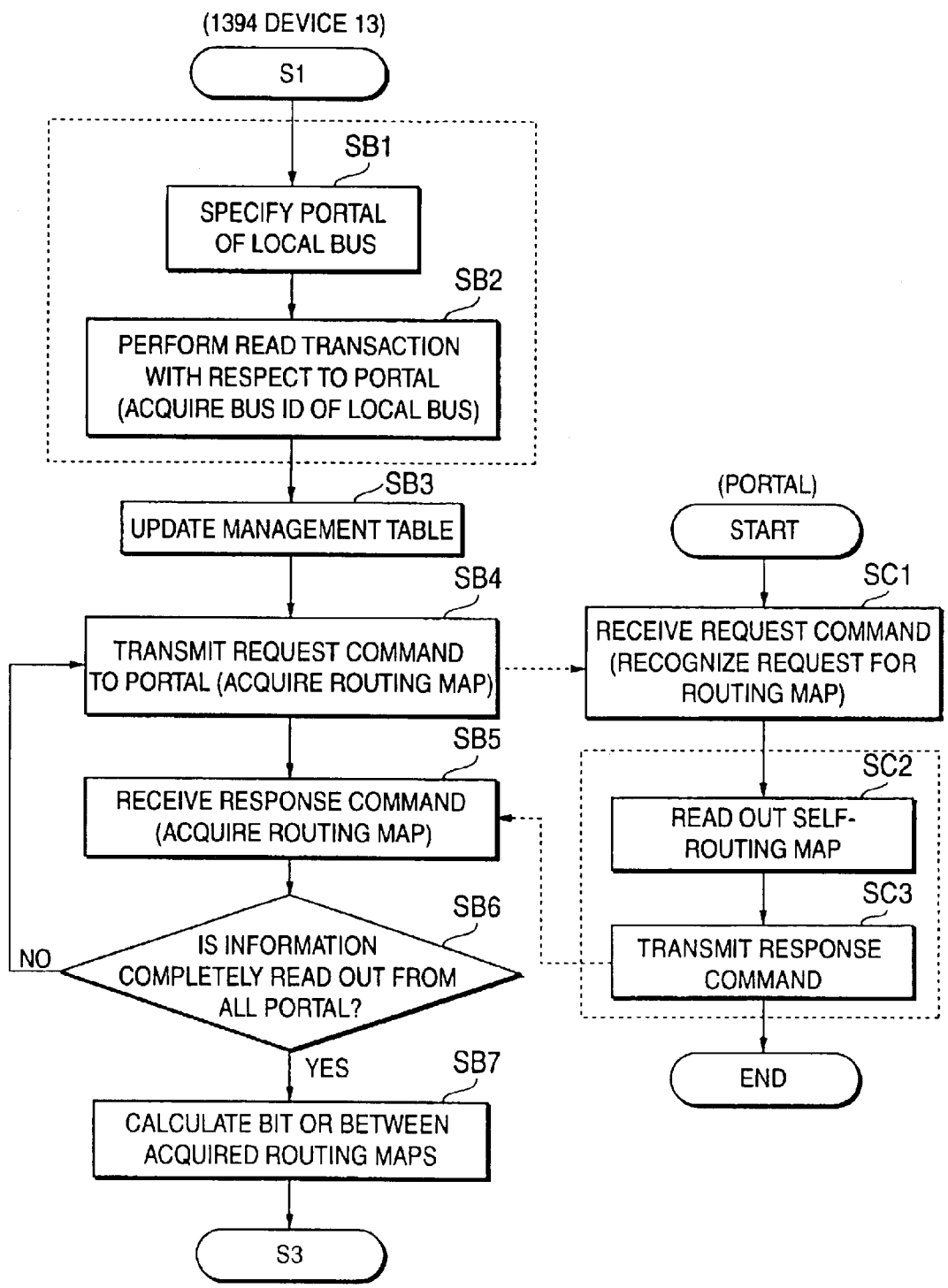
FIG. 11 is a flow chart showing the details of processing in a state S2.

FIG. 11 is a flow chart for explaining the processing of acquiring all the bus IDs used in the network in the state S2. The 1394 device 13 looks up the PORTAL field 28 in the management table for the device information acquired in the state S1 to specify the PHY IDs of the portals connected to the local bus (step SB1). The 1394 device 13 performs a read transaction with respect to the portal (portal 6) having the smallest PHY ID among the specified portals to acquire the value of the bus ID ("1" in this case) assigned to the bus 1 (step SB2). Thereafter, the 1394 device 13 updates the bus ID field 25 in the management table to the acquired value on the basis of the acquired value of the bus ID (step SB3). The 1394 device 13 looks up the PORTAL field 28 in the management table to read out routing maps from the portals 5 to 7, and stores the readout values (steps SB4 and SB5). Commands are used to read out the above routing maps. The commands will be described below.

Commands that are used to make requests to portals are called request commands, whereas commands that are used to reply to received request commands are called response commands. Request and response commands are transmitted by performing write transactions with respect to areas (to be referred to as command areas hereinafter) ensured in CSR spaces in advance. In order to cope with request and response commands, therefore, command areas need to be implemented in advance. A given 1394 device which has received request and response commands acquires the required contents and returned information by reading out the contents written in the command area.

Figure 12:
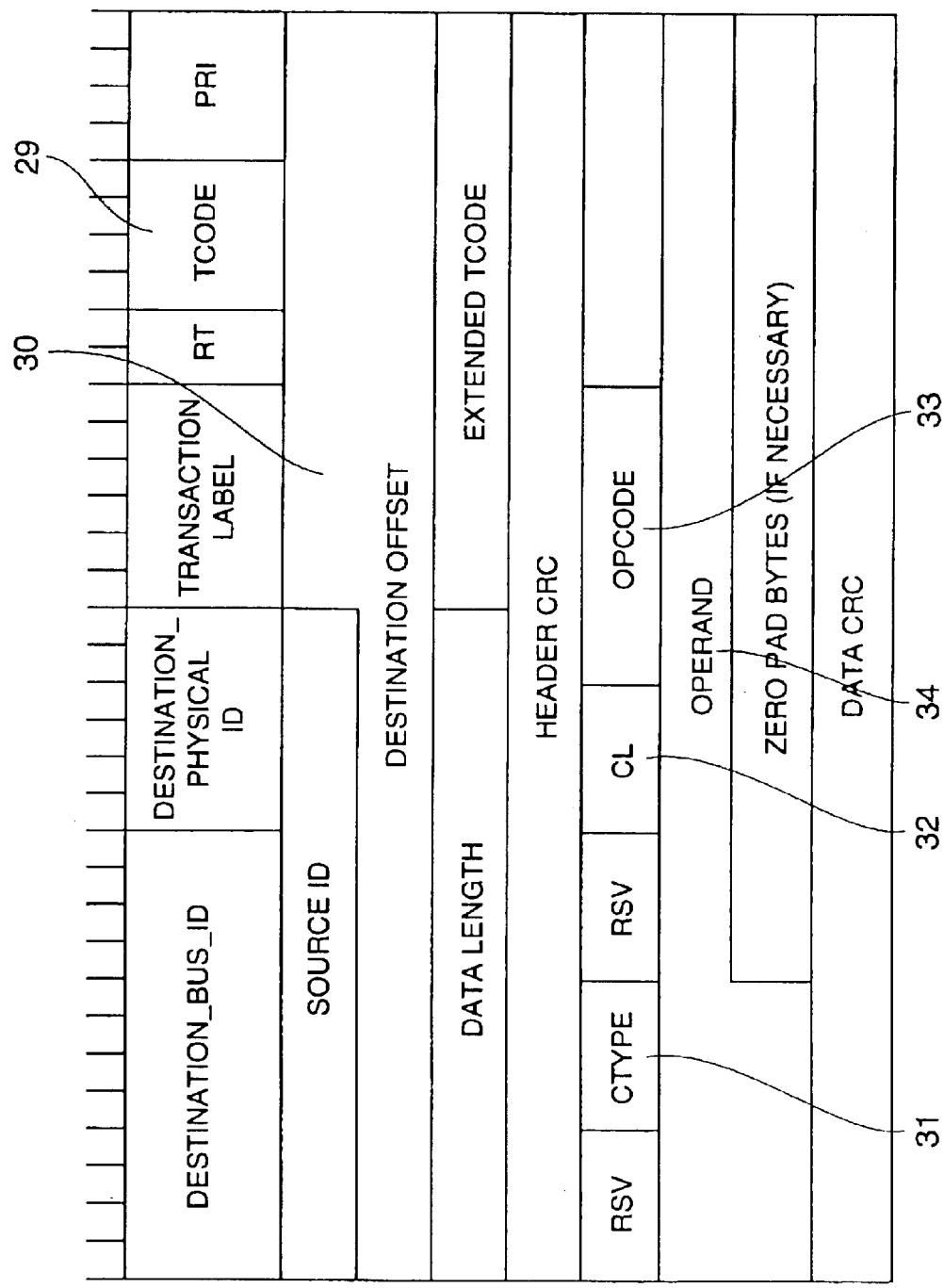
FIG. 12 is a conceptual view showing a request command and response command.

FIG. 12 is a conceptual illustration showing an example of the format of a command. Referring to FIG. 12, a value indicating a write request is written in a tcode field 29. In a destination_offset field 30, the start address of the command area ensured in the CSR space is written. Only 1394 devices that have implemented command areas can use commands. A command type field 31 is a field indicating the type of command. For example, "1h" is written for a request command, and "0h" is written for a response command. A command label field 32 is a label for identifying a command. The value of the command label field of a given request command must coincide with that of a corresponding response command. An opcode field 33 is a field indicating the operation to be performed by the 1394 device that has received the request command or the information of the state which is to be returned. An operand field 34 is a field for storing information required to execute the operation designated by the opcode field 33 or information contained in the returned information. The value of this field varies depending on the command.

Figure 13:
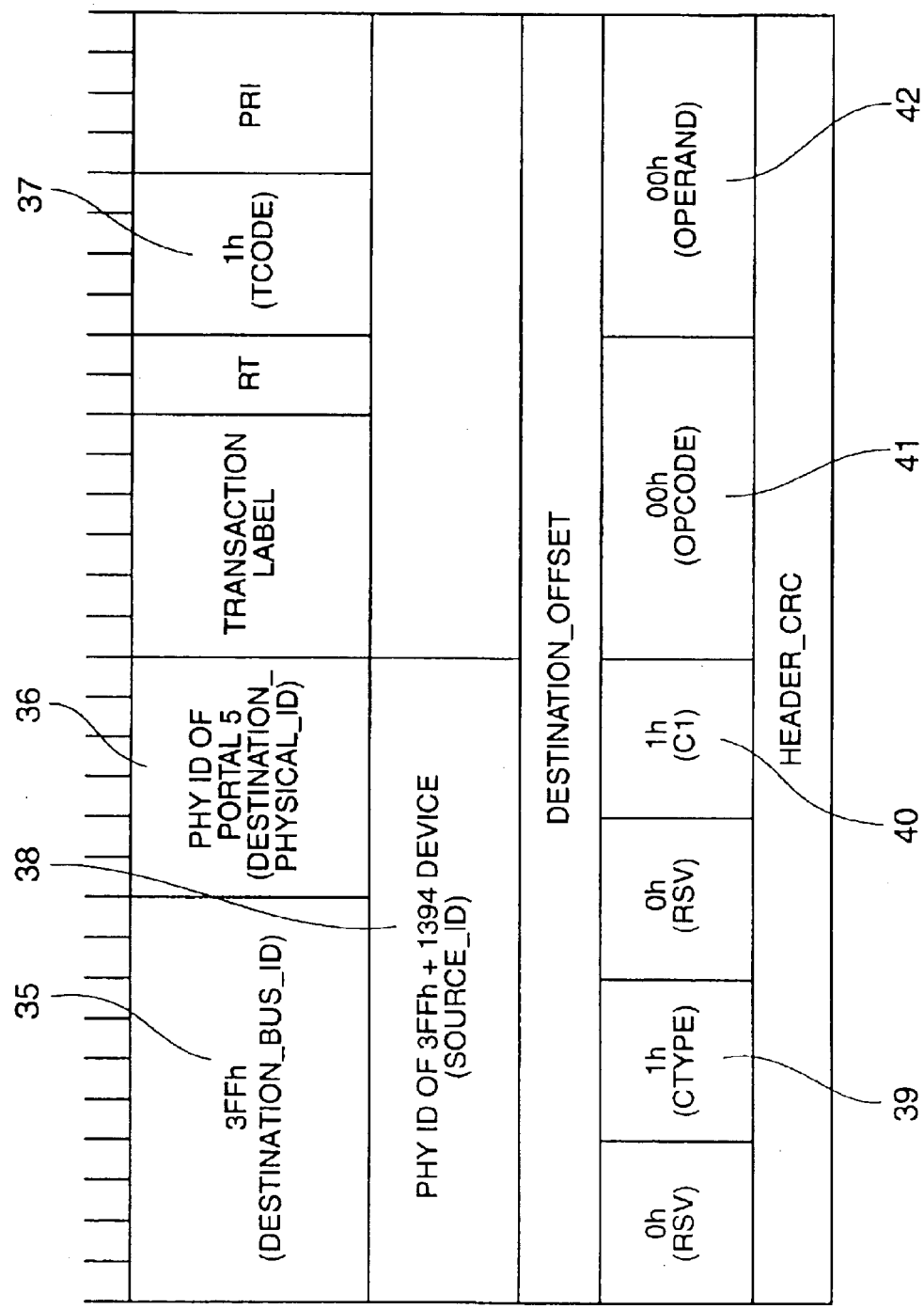
FIGS. 13 and 14 are conceptual views showing specific examples of request and response commands, respectively.

FIG. 13 is a conceptual illustration showing a specific example of the request command which the 1394 device 13 transmits to the portal 5 in step SB4 described above. Referring to FIG. 13, "3FFh" indicating communication to be performed in the local bus is set in a destination_bus_ID field 35. In a destination_physical_ID field 36, the PHY ID of the portal 5 is set. In a tcode field 37, "0h" indicating that the command is the write request for data quadlet defined by the IEEE 1394 standard is written. In a source_ID field 38, "3FFh" is written in the upper 10 bits, and the PHY ID of the 1394 device 13 is written in the lower 6 bits. In a command type field 39, a value "1h" indicating that the command is a request command is set. In a command label field 40, "1h" is set as a specific example. In an opcode field 41, a value indicating that the request command requests the return of a routing map is set. In this case, "00h" is written as a specific example. In an operand field 42, "00h" is set because it is not used by this request command.

Referring back to FIG. 11, the portal reads out the contents written in the command area and recognizes the contents requested by the request command from the opcode field of the received request command (step SC1). In this case, the portal 5 recognizes that the return of the stored routing map is requested. The portal 5 reads out the routing map stored in the portal itself (step SC2), and transmits a response command in which the routing map stored in the portal itself is written in the operand field (step SC3).

Figure 14:
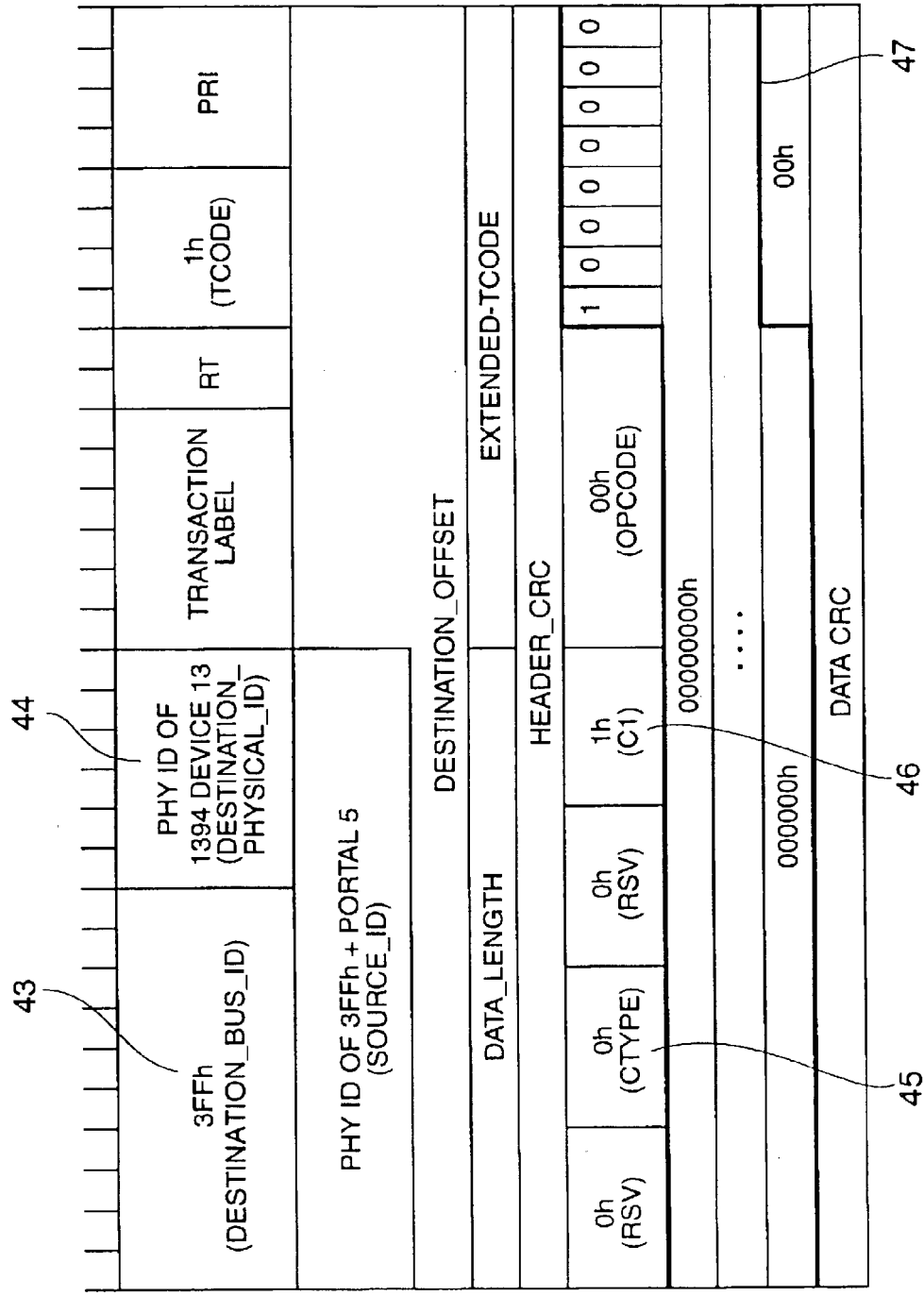

FIG. 14 is a conceptual illustration showing a specific example of the response command to be returned. Referring to FIG. 14, "3FFh" is set in a destination_bus_ID field 43, and the PHY ID of the 1394 device 13 is set in a destination_physical_ID field 44. These values can be acquired from the source_ID field 38 of the received request command. In a command type field 45, "0h" indicating that the command is a response command is set. In a command label field 46, "1h" which is the same value set in the received request command is set. In an operand field 47, the value of the routing map stored in the portal is stored.

Referring back to FIG. 11, the 1394 device 13, which has received the above response command, can read out data from the command area and acquire the routing map of the portal 5 which is written in the operand field (step SB5). The 1394 device 13 then checks whether data are completely read out from all the portals (step SB6). If this operation is not completed, the 1394 device 13 performs steps SB4 and SB5 described above for all the portals connected to the local bus. If response commands are received from all the portals and routing maps are completely acquired, the 1394 device 13 carries out the bit OR (logical OR) between the acquired routing maps, thereby acquiring all bus IDs assigned to remote buses of the bus IDs used in the network (step SB7).

When the above processing is completed, the 1394 device 13 makes a transition to the state S3.

Figure 15:
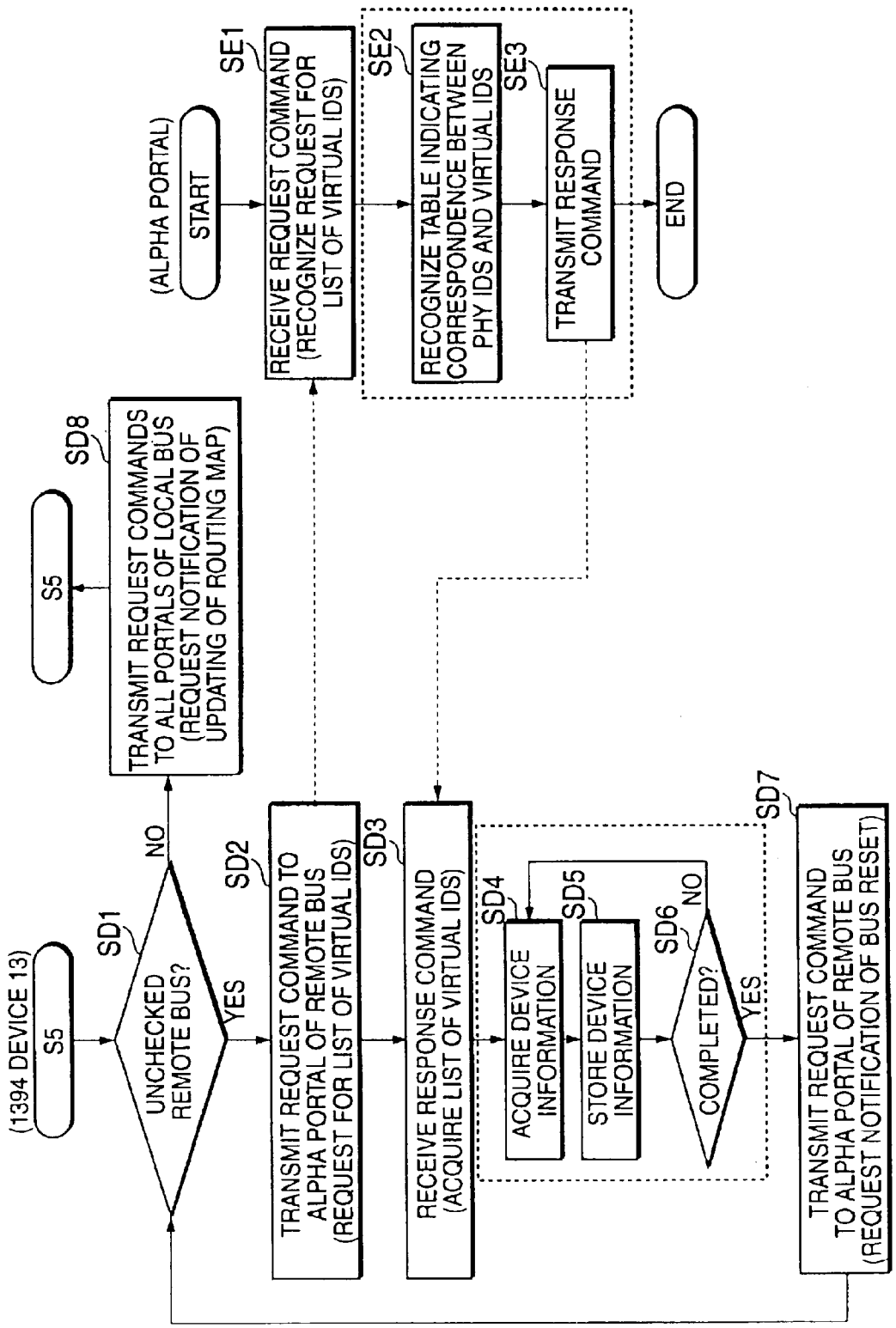
FIG. 15 is a flow chart showing the details of processing in a state S3.

(3) Information Acquisition in Remote Buses:

The 1394 device 13 which has made a transition to the state S3 acquires the device information of each 1394 device connected to a remote bus. The details of this processing will be described below with reference to the accompanying drawings. FIG. 15 is a flow chart for explaining the processing of acquiring the information of each 1394 device connected to an unchecked remote bus. The 1394 device 13 checks whether any remote bus, of the remote buses having the bus IDs acquired in the state S2, which has not undergone a check. If there are unchecked remote buses, the 1394 device 13 selects one of them (step SD1). Assume that the bus 0 is selected as an unchecked remote bus. In this case, the 1394 device 13 transmits a request command to the portal 4 to request all the virtual IDs assigned to the 1394 devices connected to the bus 0 (step SD2).

The alpha portal 4 reads out the contents of the received request command from the command area and recognizes from the opcode field that the portal itself is requested by the 1394 device 13 to notify all the virtual IDs assigned to the 1394 devices connected to the bus 0 (step SE1). Upon recognizing the request, the alpha portal 4 refers to the virtual ID/PHY ID table stored in the portal itself (step SE2), and transmits a response command in which all the virtual IDs used are written in the operand fields (step SE3).

Upon reception of the response command, the 1394 device 13 reads out the contents written in the command area and acquires all the virtual IDs which are assigned to the 1394 devices connected to the bus 0 and written in the operand fields (step SD3). The 1394 device 13 performs a read transaction for a device connected to the bus 0 on the basis of this information (virtual IDs) to read out device information (step SD4). The 1394 device 13 then stores the acquired information upon linking it to the bus ID and virtual ID of the remote bus that has been checked (step SD5). The 1394 device 13 checks whether the device information of all the devices connected to the bus 0 is completely acquired and stored (step SD6). The 1394 device 13 executes steps SD4 and SD5 until the above acquisition is completed. If the acquisition of device information is completed, the 1394 device 13 transmits a request command to the alpha portal 4 to request it to notify bus reset if it is detected in the bus 0 (step SD7). Thereafter, the flow returns to step SD1. The operation using the above request command will be described in detail later.

The above processing is repeated until no unchecked remote bus exists in the network. If no unchecked remote bus exists, the 1394 device 13 transmits a request command to each of the portals (portals 5 to 7) connected to the bus 1 to request each portal to notify, when the routing map is updated, whether a new bus is added or an existing bus is disconnected from the network, and makes a transition to the state S5 in FIG. 7 (step SD8). The operation using the above request command will be described in detail below.

(4) Management of Acquired Information:

The device information acquired by the above device information acquisition method is stored in the management table held in the 1394 device 13. FIG. 16 is a conceptual illustration showing an example of the management table stored in the 1394 device 13 when the acquisition of the device information of each 1394 device connected to the network is completed. Referring to FIG. 16, the acquired device information of each 1394 device is stored in correspondence with a combination of a bus ID and a PHY ID. Note that the pieces of information of the devices connected to the remote buses (buses 0, 2, and 3), which are acquired in the state S3, are stored in correspondence with combinations of bus IDs and virtual IDs.

(5) Updating of Device Information upon Bus Reset in Local Bus:

When bus reset occurs in the bus 1, the 1394 device 13 discards all the information corresponding to each bus ID field 25 in which "001h" is set in the stored management table upon detection of the occurrence of the bus reset. Thereafter, the 1394 device 13 makes a transition to the state S1 shown in FIG. 7, and performs the processing shown in FIG. 9 to acquire the device information of each node connected to the bus 1. After the acquisition of the device information, the 1394 device 13 makes a transition to the state S2 and performs the processing shown in FIG. 11. The 1394 device 13 then makes a transition to the state S3. In the state S3, the 1394 device 13 performs the processing shown in FIG. 15 and makes a transition to the state S5.

(6) Detection of Bus Rest in Remote Bus and Updating of Device Information:

A method of updating device information upon occurrence of bus reset in a remote bus will be described next. Assume that the device information of each 1394 device connected to a given remote bus is completely acquired. In this case, as described above, upon detecting bus reset in the remote bus, the 1394 device 13 transmits a request command to the corresponding alpha portal to notify it (step SD7 in FIG. 15). The alpha portal reads out the contents of the received request command from the command area, and recognizes from the opcode field that the received command is a request command to request notification of the occurrence of the bus reset. The alpha portal then stores the value of the source_ID field of the received asynchronous packet and the values of the command type field, command label field, and opcode field contained in the request command. Every alpha portal in the network refers to the information of the request command transmitted from the 1394 device 13 in step SD7 in FIG. 15 and stored in the portal itself upon detecting bus reset in the bus to which the portal itself is connected, and notifies the 1394 device 13 of the detection of the bus reset in the form of a response command. Processing to be performed when bus reset occurs in the bus 2 will be described below as a specific example.

Figure 17:
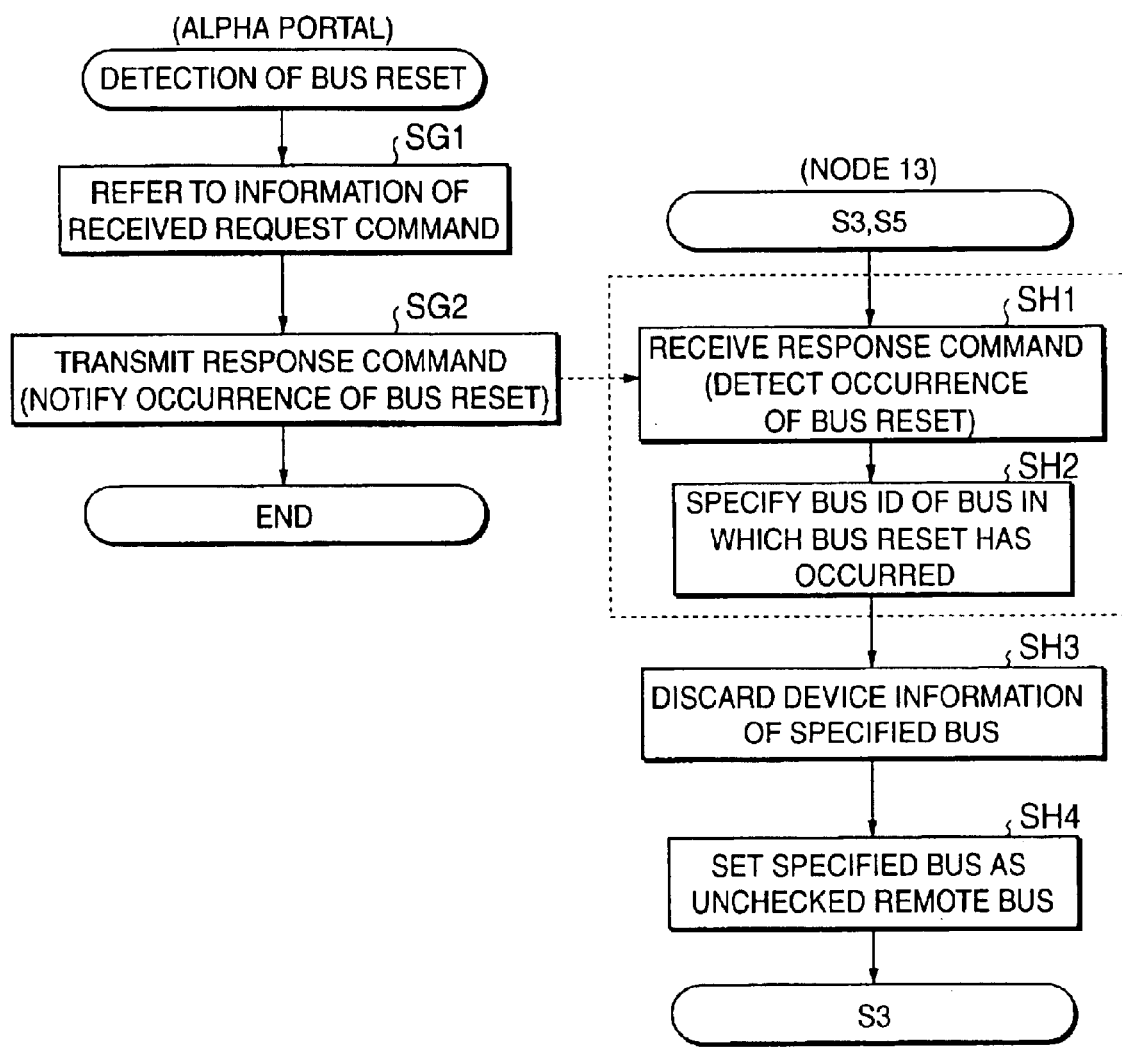
FIG. 17 is a flow chart showing processing to be performed when bus reset has occurred in a remote bus.

FIG. 17 is a flow chart for explaining the processing performed by the alpha portal and 1394 device 13 when bus reset occurs in the bus 2. Upon detecting the reset, the alpha portal 8 refers to the information of the previously received request command (step SG1) and notifies the 1394 device 13 of the occurrence of the bus reset by using a response command (step SG2).

Upon receiving the response command (step SH1), the 1394 device 13 specifies the bus ID of the bus in which the bus reset has occurred from the received response command (step SH2). In this case, the bus ID is "2". Upon specifying the bus ID, the 1394 device 13 looks up the stored management table and discards the device information corresponding to each bus ID field 25 in which "002h" is set (step SH3). The 1394 device 13 then sets the bus 2 as an unchecked remote bus and makes a transition to the state S3 (step SH4). In the state S3, since the bus is set as an unchecked remote bus, the 1394 device 13 acquires the device information of each 1394 device connected to the bus 2 again, and stores the acquired information in the management table.

With the above processing, even if bus reset occurs in a remote bus, the occurrence of the bus reset can be detected, the corresponding device information can be updated.

(7) Detection of Change in Topology in Network and Updating of Device Information:

When the pieces of device information of all the 1394 devices connected to the network are completely acquired, the 1394 device 13 transmits request commands to all the portals (portals 5 to 7) connected to the bus 1 to request them to notify updating of the routing maps when they are updated (step SD8 in FIG. 15). Upon receiving the request command, each portal recognizes that it is requested to notify the 1394 device 13 of updating of the routing map when it is updated, and stores the value of the source_ID field of the received asynchronous packet and the values of the command type field, command label field, and opcode field contained in the request command. When the routing map is updated, the corresponding portal notifies the 1394 device 13 of the updating operation in the form of a response command to the received request command.

Figure 18:
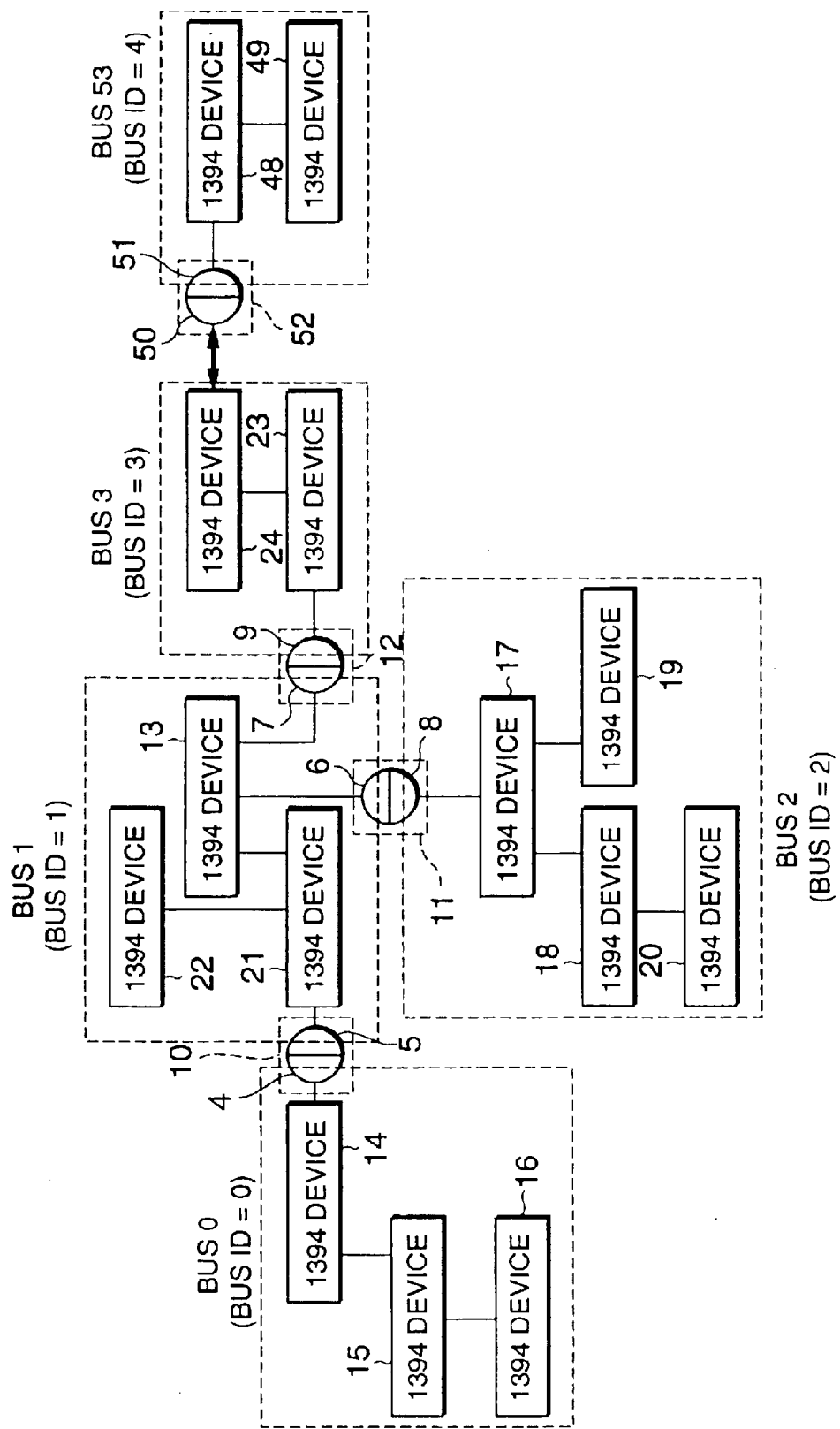
FIG. 18 is a block diagram for explaining operation to be performed when a new bus is added to an existing network.

FIG. 18 is a block diagram for explaining processing to be performed when a new bus is added to an existing network. A case wherein a new bus 53 (bus ID=4) is connected to the bus 3 will be described below as a specific example. When the bus 53 is newly connected, the routing maps in the portals 4, 8, and 7 are updated. More specifically, "4" is newly set in the routing map stored in each portal.

Upon detecting that the routing map is updated, the portal 7 detects the addition of the new value "4" by comparing the routing map before updating with the routing map after updating. The portal 7 then refers to the information of the stored request command and transmits, to the 1394 device 13, a response command in which information indicating that the bus ID is "4" is written in the operand field. Upon receiving the response command from the portal 7, the 1394 device 13 refers to the information contained in the operand field of the response command and recognizes that a new bus is connected to the network and it is bus ID is "4". Thereafter, the 1394 device 13 sets the remote bus (bus 53) whose bus ID is "4" as an unchecked remote bus, and makes a transition to the state S3 in FIG. 7. In the state S3, the processing shown in FIG. 15 is performed.

A case wherein the bus 53 in FIG. 18 is disconnected from the network will be described next as a specific example. When the bus 53 is disconnected from the network, the routing maps of the portals 4, 8, and 7 are updated. More specifically, "4" set in each routing map is deleted. Upon detecting that the routing map is updated, the user interface section 7 detects the deletion of "4" by comparing the routing map before updating with the routing map after updating. The portal 7 then refers to the request command stored in correspondence with the 1394 device 13 and transmits, to the 1394 device 13, a response command in which information indicating that "the existing bus is disconnected from the network and the bus ID of this bus is "4"" is written in the operand field. Upon receiving the response command from the portal 7, the 1394 device 13 refers to the contents contained in the response command and recognizes that the bus with the bus ID "4" is disconnected from the network. The 1394 device 13 then makes a transition to the state S4 in FIG. 7. In the state S4, the 1394 device 13 looks up the bus ID field 25 in the stored management table, and discards all the pieces of device information corresponding to each bus ID field 25 in which "004h" is set. After all the pieces of information are completely discarded, the state S5 is restored.

I-4. First Modification

As a method of detecting bus reset in a remote bus, a method of periodically inquiring of the alpha portal of the remote bus about the number of times bus reset has occurred may be used. A specific example of this method will be described below. The alpha portal has a counter whose count value increments when bus reset is detected in the bus to which the portal itself is connected. The 1394 device 13 periodically transmits a request command to the alpha portal of each remote bus to request it to notify the count value. Upon receiving the request to notify the count value, the alpha portal of each remote bus transmits a response command in which the count value is written in the operand field to the 1394 device 13. The 1394 device 13 acquires the count value at the time of the inquiry by reading out the operand field of the received response command from the command area, and compares the count value with the previously acquired count value. If the acquisition count value differs from the previously acquired value, it indicates that bus reset has occurred in the remote bus after the previous count value was acquired. According to the method described above, the device information of each device connected to a remote bus can be updated upon detection of bus reset in the remote bus.

I-5. Second Modification

As a method of detecting a change in the topology of a network, a method of periodically referring to the routing map stored in each local bus may be used. A specific example of this method will be described below. The 1394 device 13 periodically transmits, to all the portals connected to the bus 1, request commands to request them to return routing maps, and compares the value of the bit OR between the routing maps acquired from the received response commands with the value calculated from the previously acquired routing maps. With this comparison, the 1394 device 13 can recognize a change in topology and update the device information.

In the first embodiment described above, processes to be performed can be switched by discriminating whether the network is constituted by a plurality of buses or a single bus. This makes it possible to cope with any form of a network. In addition, since device information can be updated upon detection of bus reset in a remote bus or a change in the topology of the network, even when a 1394 device or bus is connected/disconnected to/from the network, such an event can be reflected in processing such as control operation using device information regardless of where it occurs.

II. Second Embodiment (1) Method of Checking Bus IDs:

In the second embodiment of the present invention, all bus IDs used in an overall network are acquired by making an inquiry to the NCM. More specifically, all the bus IDs used in the network can be known by reading out the bus ID bitmap stored in the NCM.

Figure 19:
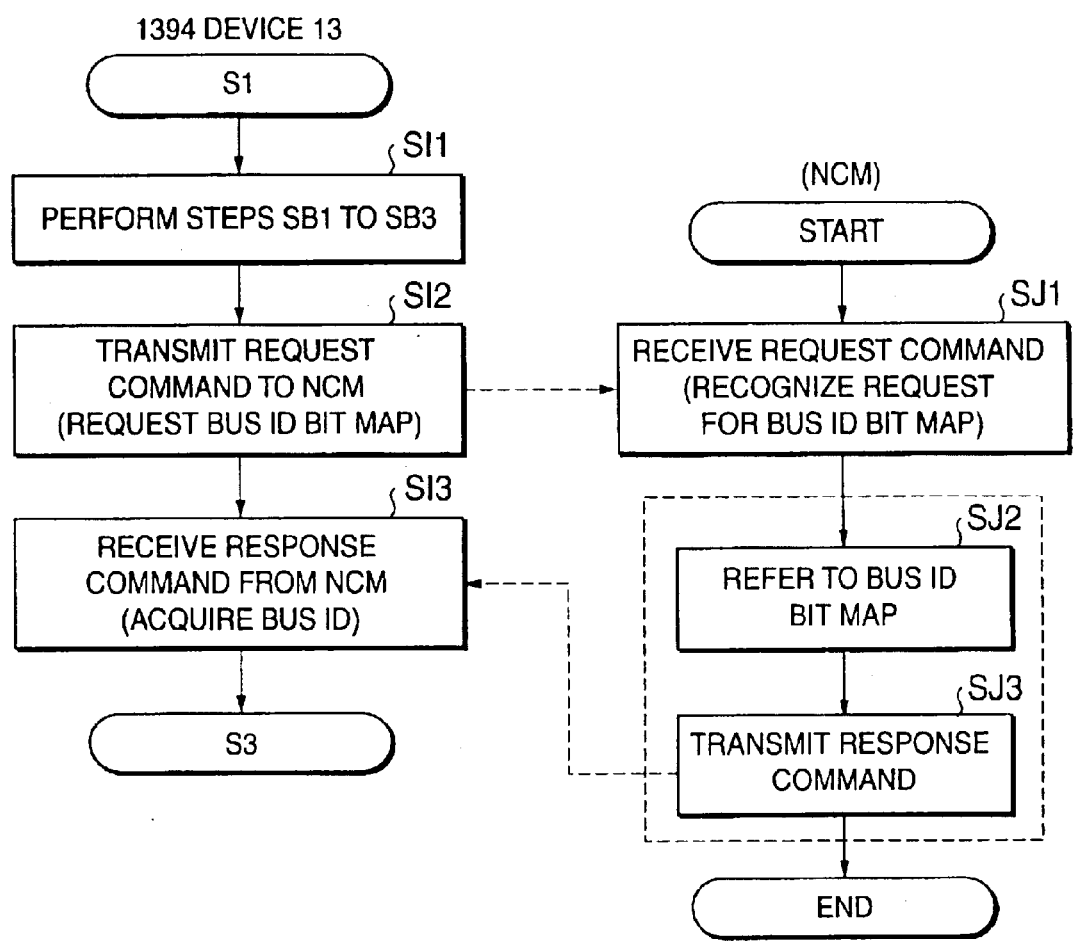
FIG. 19 is a flow chart showing the details of processing in a state S2 in the second embodiment of the present invention.

FIG. 19 is a flow chart for explaining processing in a state S2 in the second embodiment. When processing in a state S1 is completed, a 1394 device 13 makes a transition to the state S2. In the state S2, upon performing the processing in steps SB1 to SB3 shown in FIG. 11 (step SI1), the 1394 device 13 transmits a request command to an NCM 4 to request it to return a bus ID bitmap (step S12). The NCM 4 reads out the received request command from the command area and recognizes from the opcode field that it is requested to return the bus ID bitmap (step SJ1). Thereafter, the NCM 4 refers to the stored bus ID bitmap (step SJ2) and transmits, to the 1394 device 13, a response command in which the bus ID bitmap is written in the operand field (step SJ3). Upon receiving, the above response command, the 1394 device 13 reads out the received contents from the command area and acquires the information that is written in the operand field and indicates that the bus IDs in use are 0, 1, 2, and 3 (step S13). The 1394 device 13 then makes a transition to a state S3.

The second embodiment of the present invention, in addition to the effects of the first embodiment, can know all the bus IDs in use by exchanging information with the NCM once. This makes it possible to simplify the processing to be performed by the 1394 device that acquires information.

III. Third Embodiment (1) Acquisition of Information of 1394 Device Connected to Remote Bus:

In the third embodiment of the present invention, when a given device is to acquire the information of each device connected to a remote bus, the given device requests the alpha portal of the target remote bus to acquire the information of each device and then notify the acquired information. Upon receiving the request, the alpha portal acquires the device information of each node on the bus to which the portal itself is connected, and returns the acquired information to the request source. A specific example of this processing will be described below.

Figure 20:
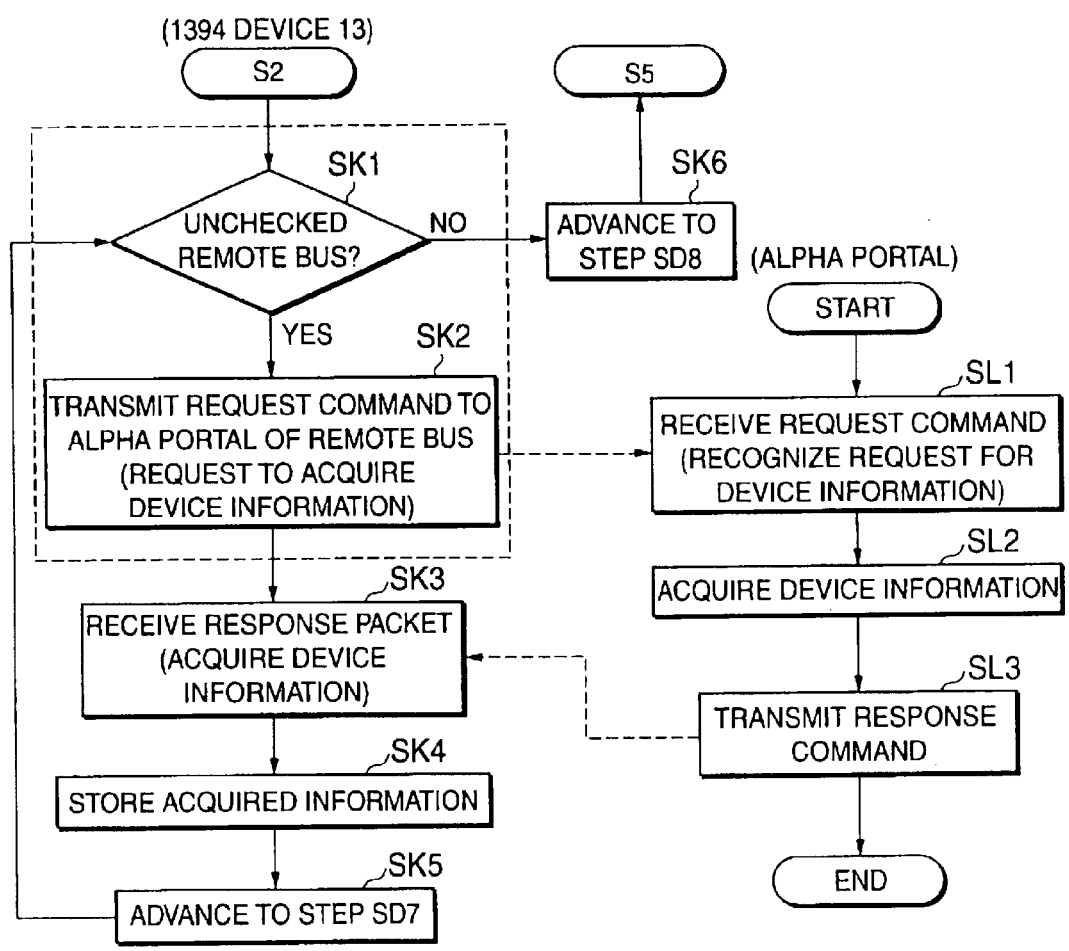
FIG. 20 is a flow chart showing the details of processing in a state S3 in the third embodiment of the present invention.

FIG. 20 is a flow chart for explaining the details of the processing performed by a 1394 device 13 in the state S3 and the operation of the alpha portal upon reception of a request command. First of all, the 1394 device 13 checks whether there is any unchecked remote bus (step SK1). If it is determined that a bus 0 is to be checked, the 1394 device 13 transmits a request command to an alpha portal 4 to request it to acquire the device information of each node connected to the bus 0 and return the acquired information (step SK2).

Upon receiving the request command, the alpha portal 4 reads out data from the command area and recognizes from the opcode field that it is requested to notify the device information of each 1394 device connected to the bus 0 (step SL1). The alpha portal 4 acquires device information by performing read transactions with respect to all the 1394 devices connected to the bus 0 in place of the 1394 device 13 (step SL2). After the acquisition of device information, the alpha portal 4 returns a response command in which the acquired information is written in the operand field to the 1394 device 13 (step SL3).

Upon receiving the response command, the 1394 device 13 reads out the received contents from the command area and acquires the device information of each 1394 device connected to the bus 0, which is written in the operand field (step SK3). The acquired information is stored in the management table (step SK4). Note that step SK5 is the same as step SD7 in FIG. 15 described above, and step SK6 is the same as step SD8 in FIG. 15.

In addition to the effects of the first embodiment of the present invention, the third embodiment can simplify the processing performed by the node which acquires information during device information acquisition processing, and hence can reduce the communication traffic between buses in acquisition of device information.

IV. Fourth Embodiment (1) Detection of Change in Topology:

In the fourth embodiment of the present invention, the bus ID bitmap stored in the NCM is periodically acquired and compared with the previously acquired bus ID bitmap to detect a change in topology. This processing will be described in detail below with reference to FIG. 8. A 1394 device 13 periodically transmits a request command to an NCM 4 to request it to return a bus ID bitmap. The 1394 device 13 can detect the addition of a new bus to the network or disconnection of an existing bus by comparing the bus ID bitmap acquired from the response command with the previously acquired bus ID bitmap. If a new bus is added, the 1394 device 13 recognizes the bus as an unchecked bus and makes a transition to a state S3. If a bus is disconnected, the 1394 device 13 makes a transition to a state S4. A change in topology may occur when the bus to which the NCM is connected is disconnected from the network. In this case, no response command is returned no matter how many a response command is retransmitted. For this reason, when the number of times of retransmission exceeds a predetermined retransmission count, the 1394 device 13 determines that the NCM is disconnected, and discards all the information stored in the management table. A state S0 is then restored.

In addition to the effects of the first embodiment of the present invention, the fourth embodiment described above can simplify the processing because it is only required to periodically transmit a request command to the NCM to detect a change in topology.

V. Fifth Embodiment (1) Updating of Device Information:

In the fifth embodiment of the present invention, all acquired device information is discarded when a predetermined period of time has elapsed, and the device information of each 1394 device connected to the network is acquired again, thereby updating the device information. More specifically, a transition to a state S5 in FIG. 7 is made, and all the device information stored in the management table is discarded after the lapse of a predetermined period of time. A transition to a state S0 is then made. This makes it possible to store the latest device information in the management table at predetermined intervals even if a new device is connected or the topology of the network changes.

V-1. Modification

According to a method of updating device information, when a predetermined period of time has elapsed, the device information of each 1394 device connected to the network is acquired again, and the acquired information is compared with the device information previously acquired and stored in the management table, thus extracting the differences therebetween. A method of updating only different points with respect to the stored device information may be used.

In addition to the effects of the first embodiment of the present invention, the fifth embodiment described above automatically updates the device information, and hence can simplify the device information update processing.

What is claimed is:

1. A device information acquisition method for acquiring device information from devices connected to a network constituted by a local bus or a plurality of buses including the local bus and one or more remote buses connected to the local bus through bridges, comprising:

the discrimination step of discriminating whether the network includes one or more remote buses, the bus ID acquisition step of acquiring a bus ID assigned to each of the remote buses, the information acquisition step of acquiring device information from all devices connected to the network, and the information discarding step of, when at least one of the remote buses is disconnected from the network, discarding device information of devices connected to the disconnected remote bus, wherein if it is discriminated in the discrimination step that the network does not include one or more remote buses, the information acquisition step is executed with respect to all devices connected to the local bus, and if it is discriminated in the discrimination step that the network is constituted by one or more remote buses, the information acquisition step is executed with respect to all devices connected to a bus having a bus ID acquired in the bus ID acquisition step, wherein a counting node having a counter indicating a number of times of occurrence of bus initialization is connected to each bus of the network, wherein the method further comprises the acquisition step of periodically acquiring a value of a counter of the counting node corresponding to a remote bus, and wherein the information acquisition step is performed again with respect to each of the devices connected to a remote bus when a value different from the previously acquired value is acquired in the acquisition step for that remote bus.

2. A method according to claim 1, wherein the discrimination step comprises checking whether the bridges are connected to the local bus, thereby discriminating whether the network includes one or more remote buses.

3. A method according to claim 1, wherein the discrimination step comprises discriminating, if the value of the bus ID acquired in the bus ID acquisition step is a predetermined value, whether the network is constituted by a single bus, and discriminating, if the value of a bus ID acquired in the bus ID acquisition step is other than the predetermined value, that the network is constituted by one or more remote buses.

4. A method according to claim 1, wherein each of the bridges on the local bus and holds forwarding information for determining whether to forward asynchronous packets to remote buses, and the bus ID acquisition step comprises acquiring forwarding information from all bridges connected to the local bus.

5. A method according to claim 1, wherein the network comprises at least one bus ID management node for managing bus ID usage information, and the bus ID acquisition step comprises acquiring bus IDs assigned to all the buses by acquiring the bus ID usage information from the bus ID management node.

6. A method according to claim 1, wherein, the information acquisition step comprises:

the identifier acquisition step of acquiring an identifier assigned to each of the devices connected to the buses of the network; and the individual device information acquisition step of acquiring the device information from each device identified by the identifier acquired in the identifier acquisition step.

7. A method according to claim 6, wherein the network comprises at least one identifier management node for managing the identifiers acquired in the identifier acquisition step by writing the identifiers in identifier usage information, and the individual device information acquisition step is performed with respect to each of the devices identified by the identifiers written in the identifier usage information.

8. A method according to claim 6, wherein at least one device information holding node for holding the device information acquired in the individual device information acquisition step is connected to each of the buses of the network and performs the identifier acquisition step and the individual device information step with respect to each of the devices connected to each bus, and the device information is acquired from the device information holding node.

9. A method according to claim 1, wherein the method further comprises the initialization notification request step of requesting respective nodes connected to respective remote buses to notify occurrence of bus initialization in the respective remote buses, and the information acquisition step is performed again with respect to each device connected to a remote bus upon reception of a notification of initialization of that remote bus.

10. A method according to claim 1, wherein a counting node having a counter indicating a number of times of occurrence of bus initialization is connected to each bus of the network, the method further comprises the acquisition step of periodically acquiring a value of a counter of the counting node corresponding to a remote bus, and the information acquisition step is performed again with respect to each of the devices connected to a remote bus when a value different from the previously acquired value is acquired in the acquisition step for that remote bus.

11. A method according to claim 1, further comprising updating the acquired device information by periodically performing the discrimination step, the bus ID acquisition step, and the information acquisition step.

12. A device information acquisition method for acquiring device information from devices connected to a network constituted by a local bus or a plurality of buses including the local bus and one or more remote buses connected to the local bus through bridges, comprising:

the discrimination step of discriminating whether the network includes one or more remote buses, the bus ID acquisition step of acquiring a bus ID assigned to each of the remote buses, the information acquisition step of acquiring device information from all devices connected to the network, and the information discarding step of, when at least one of the remote buses is disconnected from the network, discarding device information of devices connected to the disconnected remote bus, wherein if it is discriminated in the discrimination step that the network does not include one or more remote buses, the information acquisition step is executed with respect to all devices connected to the local bus, and if it is discriminated in the discrimination step that the network is constituted by one or more remote buses, the information acquisition step is executed with respect to all devices connected to a bus having a bus ID acquired in the bus ID acquisition step, wherein each of the bridges on the local bus holds forwarding information for determining whether to forward asynchronous packets to remote buses, wherein the bus ID acquisition step comprises acquiring forwarding information from all bridges connected to the local bus, wherein the method further comprises:

the update notification request step of requesting the bridge connected to the local bus to notify when the forwarding information held by the bridge is updated, and the forwarding information check step of checking whether a bit updated from a first state value to a second state value and a bit updated from the second state value to the first state value exist in the forwarding information when a notification to the update notification request step is received, wherein, when the bit updated from the first state value to the second state value is detected in the forwarding information check step, the information acquisition step is performed with respect to each device connected to a bus having a bus ID represented by the bit, and wherein, when the bit updated from the second state value to the first state value is detected, the information discarding step is performed with respect to each device connected to a bus having a bus ID represented by the bit.

13. A device information acquisition method for acquiring device information from devices connected to a network constituted by a local bus or a plurality of buses including the local bus and one or more remote buses connected to the local bus through bridges, comprising:

the discrimination step of discriminating whether the network includes one more remote buses, the bus ID acquisition step of acquiring a bus ID assigned to each of the remote buses, the information acquisition step of acquiring device information from all devices connected to the network, and the information discarding step of, when at least one of the remote buses is disconnected from the network, discarding device information of devices connected to the disconnected remote bus, wherein, if it is discriminated in the discrimination step that the network does not include one or more remote buses, the information acquisition step is executed with respect to all devices connected to the local bus, and if it is discriminated in the discrimination step that the network is constituted by one or more remote buses, the information acquisition step is executed with respect to all devices connected to a bus having a bus ID acquired in the bus ID acquisition step, wherein each of the bridges on the local bus holds forwarding information for determining whether to forward asynchronous packets to remote buses, wherein the bus ID acquisition step comprises acquiring forwarding information from all bridges connected to the local bus, wherein the method further comprises:

the forwarding information acquisition step of periodically acquiring the forwarding information held by the bridge connected to the local bus, and the forwarding information check step of checking whether a bit updated from a first state value to a second state value and a bit updated from the second state value to the first state value exist in the forwarding information acquired in the forwarding information acquisition step, wherein, when the bit updated from the first state value to the second state value is detected in the forwarding information check step, the information acquisition step is performed with respect to each device connected to a bus having bus ID represented by the bit, and when the bit updated from the second state value to the first state value is detected, the information discarding step is performed with respect to each device connected to a bus having a bus ID represented by the bit.

14. A device information acquisition method for acquiring device information from devices connected to a network constituted by a local bus or a plurality of buses including the local bus and one or more remote buses connected to the local bus through bridges, comprising:

the discrimination step of discriminating whether the network includes one or more remote buses, the bus ID acquisition step of acquiring a bus ID assigned to each of the remote buses, the information acquisition step of acquiring device information from all devices connected to the network, and the information discarding step of, when at least one of the remote buses is disconnected from the network, discarding device information of devices connected to the disconnected remote bus, wherein if it is discriminated in the discrimination step that the network does not include one or more remote buses, the information acquisition step is executed with respect to all devices connected to the local bus, and if it is discriminated in the discrimination step that the network is constituted by one or more remote buses, the information acquisition step is executed with respect to all devices connected to a bus having a bus ID acquired in the bus ID acquisition step, wherein the network comprises at least one bus ID management node for managing bus ID usage information, wherein the bus ID acquisition step comprises acquiring bus IDs assigned to all the buses by acquiring the bus ID usage information from the bus ID management node, wherein the method further comprises the bus ID change check step of periodically acquiring the bus ID usage information and determining on the basis of the acquired bus ID usage information whether a newly used bus ID or a bus ID that has not been used exists, and when existence of the newly used bus ID is detected in the bus ID change check step, the information acquisition step is performed with respect to each device connected to a bus identified by the bus ID, and when existence of a bus ID that has not been used is detected, the information discarding step is performed with respect to each device connected to a bus identified by the bus ID.

15. A device controller for acquiring device information in which a function of devices is written from the devices connected to a network constituted by a single bus which is a local bus to which the devices are connected or a network formed by connecting, through bridges, a plurality of buses including the local bus and remote buses to which the devices are not connected, the device controller comprising:

discriminating means for discriminating whether the network is constituted by a plurality of buses or a single bus;

bus ID acquisition means for acquiring a bus ID assigned to each of the remote buses;

information acquisition means for acquiring device information from all devices connected to the network; and information discarding means for, when at least one of the remote buses is disconnected from the network, discarding device information of devices connected to the disconnected remote bus;

wherein if it is discriminated by the discrimination means that the network is constituted by a single bus, the information acquisition means acquires information with respect to all devices connected to the local bus; and if it is discriminated by the discrimination means that the network is constituted by a plurality of buses, the information acquisition means acquires information with respect to all devices connected to the buses each having the bus ID acquired by the bus ID acquisition means.

16. A device controller according to claim 15, wherein the discrimination means checks whether the bridges are connected to the local bus, thereby discriminating whether the network is constituted by a plurality of buses.

17. A device controller according to claim 15, wherein the discrimination means discriminates, if the value of the bus ID acquired by the bus ID acquisition means is a predetermined value, whether the network is constituted by a single bus, and discriminates, if the value of the bus ID is other than the predetermined value, that the network is constituted by a plurality of buses.

18. A device controller according to claim 15, wherein each of the bridges receives an asynchronous packet on the local bus and holds forwarding information for determining whether to forward the asynchronous packet to the remote buses, and the bus ID acquisition means acquires forwarding information from all bridges connected to the local bus.

19. A device controller according to claim 15, further comprising:

at least one bus ID management node for managing bus ID usage information in which all bus IDs assigned to at least one bus constituting the network is connected to the network, and wherein the bus ID acquisition means acquires bus IDs assigned to all the buses by acquiring the bus ID usage information from the bus ID management node.

20. A device controller according to claim 19, further comprising:
forwarding information acquisition means for periodically acquiring the forwarding information held by the bridge connected to the local bus; and
forwarding information check means for checking whether a bit updated from a first state value to a second state value and a bit updated from the second state value to the first state value exist in the forwarding information acquired by the forwarding information acquisition means, and
wherein, when the bit updated from the first state value to the second state value is detected by the forwarding information check means, the information acquisition means performs information acquisition again with respect to each device connected to a bus having bus ID represented by the bit, and when the bit updated from the second state value to the first state value is detected, the information discarding means performs information discarding with respect to each device connected to a bus having a bus ID represented by the bit.

21. A device controller according to claim 15, wherein the information acquisition means comprises:
identifier acquisition means for acquiring an identifier assigned to each of the devices connected to the buses of the network; and
individual device information acquisition means for acquiring the device information from each device identified by the identifier acquired by the identifier acquisition means.

22. A device controller according to claim 21, further comprising:
at least one identifier management node for managing the identifiers, acquired by performing the identifier acquisition means with respect to the respective devices connected to each bus, by writing the identifiers in identifier usage information is connected to each of the buses of the network, and
wherein the individual device information acquisition means performs information acquisition with respect to each of the devices identified by the identifier written in the identifier usage information acquired from the identifier management node.

23. A device controller according to claim 21, further comprising:
bus ID change check means for periodically acquiring the bus ID usage information and checking on the basis of the acquired bus ID usage information whether a newly used bus ID or a bus ID that has not been used exists, and
wherein, when existence of the newly used bus ID is detected by the bus ID change check means, the information acquisition means performs information acquisition again with respect to each device connected to a bus identified by the bus ID, and when existence of a bus ID that has not been used is detected, the information discarding means performs information discarding with respect to each device connected to a bus identified by the bus ID.

24. A device controller according to claim 15, further comprising:
initialization notification request means for requesting the node connected to the remote bus to notify occurrence of bus initialization in each of the remote buses, and
wherein the information acquisition means performs information acquisition again with respect to each of the devices connected to the remote bus upon reception of a notification by the initialization notification request means.

25. A device controller according to claim 15, further comprising:
at least counting node having a counter indicating the number of times of occurrence of bus initialization in the single bus or the plural buses of the network is connected to each bus; and
means for periodically acquiring a value of the counter of the counting node connected to the remote bus;
wherein the information acquisition means performs information acquisition again with respect to each of the devices connected to each of the remote buses when a value different from the previously acquired value is acquired by the acquisition means.

26. A device according to claim 19, further comprising:
update notification request means for requesting the bridge connected to the local bus to notify that the forwarding information held by the bridge is updated; and
forwarding information check means for checking whether a bit updated from a first state value to a second state value and a bit updated from the second state value to the first state value exist in the forwarding information when a notification by the update notification request means is received;
wherein, when the bit updated from the first state value to the second state value is detected by the forwarding information check means, the information acquisition means performs information acquisition again with respect to each device connected to a bus having a bus ID represented by the bit, and when the bit updated from the second state value to the first state value is detected, the information discarding means performs information discarding with respect to each device connected to a bus having a bus ID represented by the bit.

27. A device information acquisition system, comprising:
a device controller which includes:
discriminating means for discriminating whether the network is constituted by a plurality of buses or a single bus;
bus ID acquisition means for acquiring a bus ID assigned to each of the remote buses;
information acquisition means for acquiring device information from all devices connected to the network; and
information discarding means for, when at least one of the remote buses is disconnected from the network, discarding device information of devices connected to the disconnected remote bus;
wherein if it is discriminated by the discrimination means that the network is constituted by a single bus, the information acquisition means acquires information with respect to all devices connected to the local bus, and
if it is discriminated by the discrimination means that the network is constituted by a plurality of buses, the information acquisition means acquires information with respect to all devices connected to the buses each having the bus ID acquired by the bus ID acquisition means; and
a bridge for forming a network by connecting a plurality of buses to which devices are connected, the bridge including:

transmission means for, upon reception of a read request output by the device controller for information held by the bridge, transmitting the information to the device controller.

28. A device information acquisition method of acquiring device information in which a function of devices is written from the devices connected to a network constituted by a single bus which is a local bus to which the devices are connected or a network formed by connecting, through bridges, a plurality of buses including the local bus and remote buses to which the devices are not connected, comprising:

a discrimination step of discriminating whether the network is constituted by a plurality of buses or a single bus;

a bus ID acquisition step of acquiring a bus ID assigned to each of the remote buses;

an information acquisition step of acquiring device information from all devices connected to the network; and an information discarding step of, when at least one of the remote buses is disconnected from the network, discarding device information of devices connected to the disconnected remote bus;

wherein if it is discriminated in the discrimination step that the network is constituted by a single bus, the information acquisition step is executed with respect to all devices connected to the local bus, and if it is discriminated in the discrimination step that the network is constituted by a plurality of buses, the information acquisition step is executed with respect to all devices connected to the buses each having the bus ID acquired in the bus ID acquisition step.

29. A method according to claim 28, wherein the discrimination step comprises checking whether the bridges are connected to the local bus, thereby discriminating whether the network is constituted by a plurality of buses.

30. A method according to claim 28, wherein the discrimination step comprises discriminating, if the value of the bus ID acquired in the bus ID acquisition step is a predetermined value, whether the network is constituted by a single bus, and discriminating, if the value of the bus ID is other than the predetermined value, that the network is constituted by a plurality of buses.

31. A method according to claim 28, wherein each of the bridges receives an asynchronous packet on the local bus and holds forwarding information for determining whether to forward the asynchronous packet to the remote buses, and the bus ID acquisition step comprises acquiring forwarding information from all bridges connected to the local bus.

32. A method according to claim 28, wherein at least one bus ID management node for managing bus ID usage information in which all bus IDs assigned to at least one bus constituting the network is connected to the network, and the bus ID acquisition step comprises acquiring bus IDs assigned to all the buses by acquiring the bus ID usage information from the bus ID management node.

33. A method according to claim 28, wherein the information acquisition step comprises:

an identifier acquisition step of acquiring an identifier assigned to each of the devices connected to the buses of the network; and an individual device information acquisition step of acquiring the device information from each device identified by the identifier acquired in the identifier acquisition step.

34. A method according to claim 33, wherein at least one identifier management node for managing the identifiers, acquired by performing the identifier acquisition step with respect to the respective devices connected to each bus, by writing the identifiers in identifier usage information is connected to each of the buses of the network, and the individual device information acquisition step is performed with respect to each of the devices identified by the identifier written in the identifier usage information acquired from the identifier management node.

35. A method according to claim 33, wherein at least one device information holding node for holding the device information acquired in the individual device information acquisition step is connected to each of the buses of the network by performing the identifier acquisition step and the individual device information step with respect to each of the devices connected to each bus, and the device information is acquired from the device information holding node.

36. A method according to claim 28, wherein the method further comprises an initialization notification request step of requesting the node connected to the remote bus to notify occurrence of bus initialization in each of the remote buses, and the information acquisition step is performed again with respect to each of the devices connected to the remote bus upon reception of a notification to the initialization notification request step.

37. A method according to claim 28, wherein at least counting node having a counter indicating the number of times of occurrence of bus initialization in the single bus or the plural buses of the network is connected to each bus, the method further comprises an acquisition step of periodically acquiring a value of the counter of the counting node connected to the remote bus, and the information acquisition step is performed again with respect to each of the devices connected to each of the remote buses when a value different from the previously acquired value is acquired in the acquisition step.

* * * * *